(12) United States Patent
Ermakov et al.

(10) Patent No.: US 8,483,881 B2
(45) Date of Patent: Jul. 9, 2013

(54) LOCALIZATION AND MAPPING SYSTEM AND METHOD FOR A ROBOTIC DEVICE

(75) Inventors: Vladimir Ermakov, Santa Clara, CA (US); Mark Woodward, Cambridge, MA (US); Joe Augenbraun, Foster City, CA (US)

(73) Assignee: Neato Robotics, Inc., Newark, CA (US)

( * ) Notice: Subject to any disclaimer, the term of this patent is extended or adjusted under 35 U.S.C. 154(b) by 877 days.

(21) Appl. No.: 11/515,100

(22) Filed: Sep. 1, 2006

(65) Prior Publication Data

US 2007/0061043 A1    Mar. 15, 2007

Related U.S. Application Data

(60) Provisional application No. 60/713,838, filed on Sep. 2, 2005, provisional application No. 60/722,781, filed on Sep. 29, 2005, provisional application No. 60/722,856, filed on Sep. 29, 2005.

(51) Int. Cl.
    *G05B 15/00*    (2006.01)

(52) U.S. Cl.
    USPC ........... 700/259; 700/245; 700/250; 700/253; 700/255; 382/153; 901/1; 901/47

(58) Field of Classification Search
    USPC ................ 700/245, 250, 251, 252, 253, 254, 700/255; 382/153
    See application file for complete search history.

(56) References Cited

U.S. PATENT DOCUMENTS

| | | | |
|---|---|---|---|
| 4,948,246 A | 8/1990 | Shigematsu |
| 5,006,721 A | 4/1991 | Cameron et al. |
| 5,040,116 A | 8/1991 | Evans, Jr. et al. |
| 5,313,063 A | 5/1994 | Netzer |
| 5,760,390 A | 6/1998 | Vezzalini et al. |
| 5,905,567 A | 5/1999 | Dewan |
| 6,480,270 B1 | 11/2002 | Studnicka et al. |
| 6,542,789 B2 | 4/2003 | Ufheil |
| 6,611,738 B2 | 8/2003 | Ruffner |
| 6,728,598 B2 | 4/2004 | Fujita |
| 6,741,054 B2 | 5/2004 | Koselka et al. |
| 6,989,890 B2 | 1/2006 | Riegl et al. |

(Continued)

FOREIGN PATENT DOCUMENTS

| | | |
|---|---|---|
| DE | 19757847 A1 | 7/1997 |
| DE | 2006017076 U1 | 1/2007 |

(Continued)

OTHER PUBLICATIONS

A. J. Davison, N. Kita, "Sequential localisation and map-building for real-time computer vision and robotics," Robotics and Autonomous Systems, 2001, pp. 171-183.*

(Continued)

*Primary Examiner* — Thomas Black
*Assistant Examiner* — Peter D Nolan
(74) *Attorney, Agent, or Firm* — Kenyon & Kenyon LLP

(57) ABSTRACT

A multi-function robotic device may have utility in various applications. In accordance with one aspect, a multi-function robotic device may be selectively configurable to perform a desired function in accordance with the capabilities of a selectively removable functional cartridge operably coupled with a robot body. Localization and mapping techniques may employ partial maps associated with portions of an operating environment, data compression, or both.

10 Claims, 19 Drawing Sheets

U.S. PATENT DOCUMENTS

| | | |
|---|---|---|
| 7,120,517 B2 | 10/2006 | Friedman |
| 7,202,941 B2 | 4/2007 | Munro |
| 2003/0195658 A1 | 10/2003 | Takano |
| 2004/0065810 A1 | 4/2004 | Casteleiro |
| 2004/0167670 A1 | 8/2004 | Goncalves et al. |
| 2004/0168148 A1* | 8/2004 | Goncalves et al. ............ 717/104 |
| 2005/0216126 A1* | 9/2005 | Koselka et al. ............... 700/259 |
| 2005/0246065 A1 | 11/2005 | Ricard |
| 2006/0027404 A1* | 2/2006 | Foxlin ........................ 178/18.06 |
| 2006/0041331 A1* | 2/2006 | Myeong et al. ............... 700/245 |
| 2006/0232787 A1 | 10/2006 | Hoffmann et al. |
| 2006/0288519 A1 | 12/2006 | Jaworski et al. |
| 2007/0061043 A1 | 3/2007 | Ermakov et al. |
| 2007/0076089 A1 | 4/2007 | DePue et al. |
| 2008/0105067 A1 | 5/2008 | Frey |
| 2009/0138233 A1 | 5/2009 | Kludas et al. |
| 2010/0020306 A1 | 1/2010 | Hall |
| 2011/0170113 A1 | 7/2011 | Bridges et al. |

FOREIGN PATENT DOCUMENTS

| | | |
|---|---|---|
| JP | 59116806 A | 7/1984 |
| JP | 62257077 A | 11/1987 |
| JP | 63055409 A | 3/1988 |
| JP | 1106204 A | 4/1989 |
| JP | 3137507 A | 6/1991 |
| JP | 3181812 A | 8/1991 |
| JP | 05087922 A | 4/1993 |
| JP | 6214149 A | 8/1994 |
| JP | 7190848 A | 7/1995 |
| JP | 10166971 A | 6/1998 |
| WO | 2007/028049 A2 | 3/2007 |

OTHER PUBLICATIONS

K. Hsiao, H. Plinval-Salgues, J. Miller, "Particle Filters and Their Applications," Cognitive Robotics, Apr. 11, 2005.*

S. Thrun, M. Montemerlo, D. Koller, B. Wegbreit, J. Nieto, E. Nebot, "FastSLAM: An efficient solution to the simultaneous localization and mapping problem with unknown data association," Journal of Machine Learning Research, 2004.*

K. Kouzoubov, "Hybrid Topological/Metric Approach to SLAM," In Proc. IEEE International Conference on Robotics and Automation '04, 2004, pp. 872-877.*

C. Stachniss, D. Hahnel and W. Burgard, "Exploration with Active Loop-Closing for FastSLAM," In Proc. 2004 IEEE/RSJ International Conference on Intelligent Robotics, 2004, pp. 1505-1510.*

J. Folkesson and H. Christensen, "Outdoor Exploration and SLAM using a Compressed Filter," In Proc. IEEE Intl. Conf on Robotics and Automation, 2003, pp. 419-426.*

A. Makarenko, S. Williams, F. Bourgault, H. Durrant-Whyte, "An Experiment in Integrated Exploration," In Proc. 2002 IEEE-RSJ Intl. Conference on Intelligent Robots and Systems, 2002, pp. 534-539.*

J. Folkeson, P. Jensfelt and H. Christensen, "Vision SLAM in the Measurement Subspace," In Proc. 2005 IEEE International Conference on Robotics and Automation, Apr. 2005, pp. 30-35.*

Jack Buffington, "Rubber Bands 'Laser Range Finding' and Bailing Wire", Servo Magazine, Sep. 2006, pp. 19-23.

F. Blais, "NRC CNRC Review of 20 Years of Range Sensor Development", Journal of Electronic Imaging, Jan. 2004, 13(1):231-240.

K.H. Strobl, W. Sepp, E. Wahl, T. Bodenmuller, M. Suppa, J.F. Seara, and G. Hirzinger, "The DLR Multisensory Hand-Guided Device: The Laser Stripe Profiler", Institute of Robotics and Mechatronics German Aerospace Center DLR, IEEE 2004.

C. Mertz, J. Kozar, J.R. Miller, and C. Thorge, "Eye-safe Laser Line Striper for Outside Use", Robotics Institute, Carnegie Mellon University.

* cited by examiner

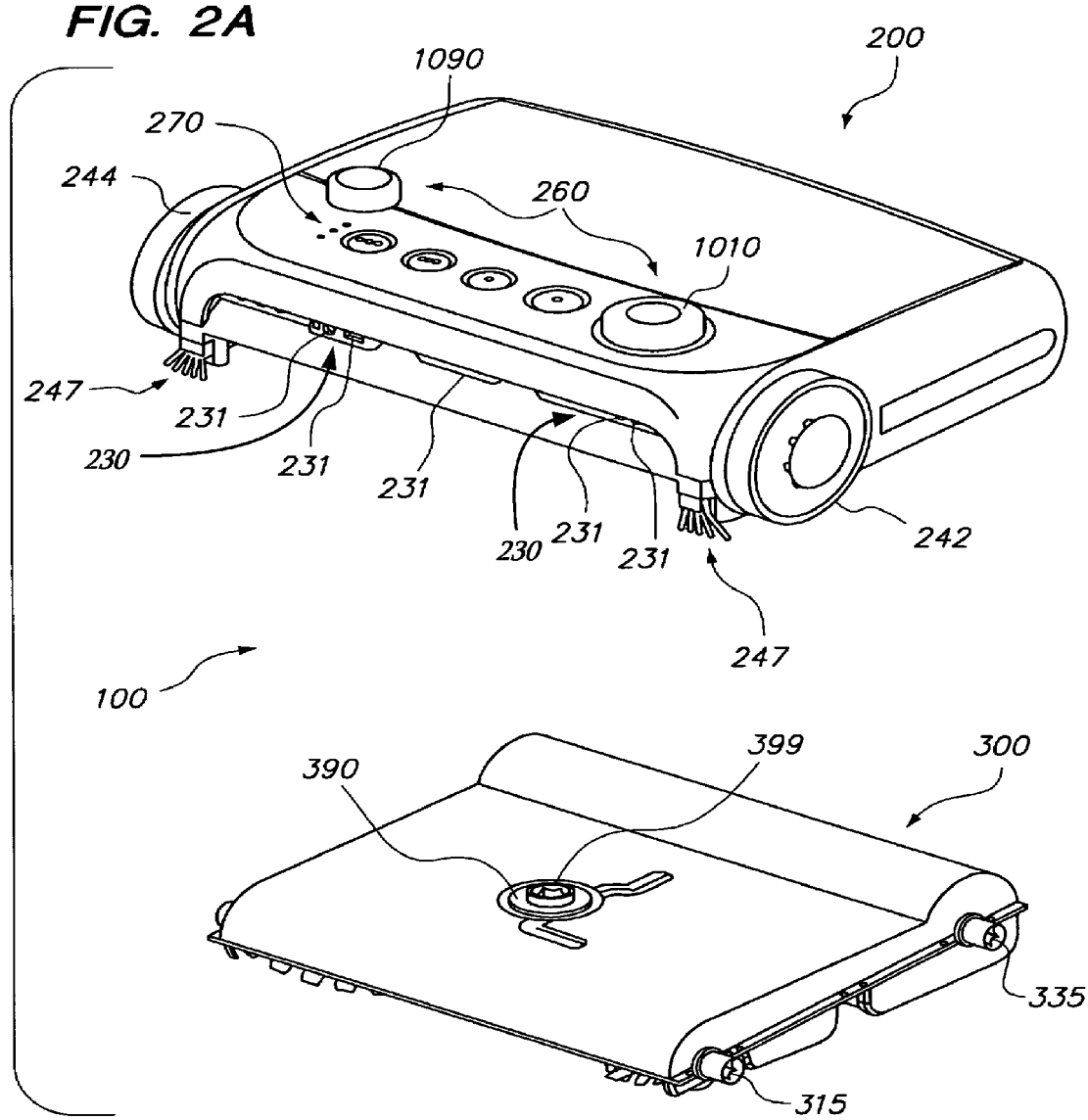

LOCALIZATION AND MAPPING SYSTEM AND METHOD FOR A ROBOTIC DEVICE

CROSS-REFERENCE TO RELATED APPLICATIONS

The present application claims the benefit of the following U.S. provisional application Ser. No. 60/713,838, filed Sep. 2, 2005, entitled "CARTRIDGE FOR ROBOTIC DEVICES"; Ser. No. 60/722,781, filed Sep. 29, 2005, entitled "LASER AND CAMERA-BASED FEATURES FOR CONSUMER ROBOTS"; and Ser. No. 60/722,856, filed Sep. 29, 2005, entitled "WALL BASE AND SELF-RECHARGING FEATURES FOR SELF-MOBILE ROBOTS". The disclosures of the foregoing provisional applications are hereby incorporated herein by reference in their entireties.

BACKGROUND

1. Field of the Invention

Aspects of the present invention relate generally to the field of robotic devices, and more particularly to a multi-function robotic device having utility in various applications.

2. Description of Related Art

Automatic or autonomous devices (i.e., robotic devices or robots) that can be used for home and commercial applications, such as cleaning, often utilize consumables that need to be replenished; in this context, such consumables generally include, but are not limited to, fresh water or fluid cleaning solutions, floor wax, buffers or cleaning pads, and the like. Conventional devices of this nature categorically require an owner or operator to refill liquid reservoirs or otherwise to replenish consumable supplies manually. From a consumer's perspective, it is generally recognized that the handling and installation of such consumables can be difficult, laborious, messy, or a combination of each. From a manufacturer's perspective, distribution of multiple consumables for use with a single device can be inefficient, difficult (e.g., due to distribution channel constraints), or both. Conventional technology has failed to provide a simple and efficient way for an owner or operator of a robotic device to replenish consumables required by the device.

Robotic devices often allow a certain degree of user direction or control in order to affect functional characteristics or operational behavior; whether capable of operating completely or only partially autonomously, however, a functional robotic device generally must be operative to navigate around an environment with no, or minimal, input from a user or an operator. To be cost-effective for many home or commercial applications, conventional sensor systems enabling or facilitating robot navigation tend to be very simple. In that regard, primitive navigation systems cause conventional devices to ricochet around an operating environment inefficiently; these devices reactively carom off of obstacles and repeatedly revisit areas that have already been treated, wasting valuable consumables and battery capacity. As an alternative, it would be useful to implement a sophisticated sensor system in a way that serves a number of functions while minimizing or eliminating redundancies to maintain cost-effectiveness.

When a robot is not operating, it is often desirable to remove the robot from its operating environment after its task is complete. For example, a robotic device tasked with cleaning a kitchen floor may present a hazard to occupants of the kitchen if it remains in a traffic area even after it has completed a cleaning cycle. Conventional mechanisms (such as "docking" or charging stations) that purport to facilitate robot storage are deficient; as a result of inefficient mechanical and electrical mating structures, as well as inadequate navigational capabilities, many robots cannot reliably and consistently engage with conventional docking or charging stations. While failing to provide a reliable robot storage and charging solution, conventional implementations also generally fail to allow a robot to view its operating environment from an advantageous perspective when engaged in its base or charging station.

Additionally, conventional robotic devices are generally application- or task-specific, i.e., they are configured and operative to perform a specific function to the exclusion of other functions. As an example, a floor mopping robot may include structural elements that are specifically designed and operative to enable mopping functionality; additionally, computer hardware and software, any sensor systems, and the like, that govern or otherwise influence operation of the robot are all dedicated exclusively to the particular application-specific structural arrangement that allows the robot to mop a floor. Such a floor mopping robot cannot be reconfigured to perform other operations (e.g., vacuuming a floor or waxing a floor) without significant structural modifications; in addition, sensor reconfiguration, software reprogramming, or some combination thereof is also required in order to alter the overall functionality of a typical robotic platform. Conventional technology has failed to provide a simple and efficient way for an owner or operator of a robotic device selectively to reconfigure the device to perform a desired function.

SUMMARY

Embodiments of the present invention overcome the above-mentioned and various other shortcomings of conventional technology, providing a multi-function robotic device having utility in various applications. In accordance with one aspect of the present invention, a multi-function robotic device may be selectively configurable to perform a desired function.

As set forth in more detail below, some embodiments of a method of mapping an operating environment to facilitate navigation of a robot generally comprise: acquiring optical data at a scan point associated with a partial map representing a portion of the operating environment; identifying features of the portion of the operating environment and associating identified features with the partial map; traversing the portion of the operating environment represented by the partial map; acquiring additional optical data; and updating the partial map responsive to the traversing and the acquiring additional data. Such a method may further comprise selectively repeating the traversing, the acquiring additional data, and the updating.

Embodiments are disclosed which further comprise exiting the partial map and proceeding to a scan point of a different partial map representing a different portion of the operating environment. Acquiring optical data and acquiring additional optical data may comprise utilizing a source of collimated light, utilizing a source of diffuse light, or both. In some embodiments, the identifying and the updating comprise computing a distance to an identified feature responsive to the optical data and the additional optical data.

Some methods of mapping an operating environment to facilitate navigation of a robot generally comprise: segmenting the operating environment into a plurality of partial maps, each respective one of the plurality of partial maps representing a respective portion of the operating environment; mapping a respective one of the plurality of partial maps by: acquiring optical data to identify features associated with the respective portion of the operating environment; responsive to the acquiring, associating identified features with the respective one of the plurality of partial maps; selectively repeating the acquiring and the associating; and exiting the respective one of the plurality of partial maps and proceeding to a different one of the plurality of partial maps representing a different portion of the operating environment. Some such embodiments comprise selectively repeating the mapping until each respective portion of the operating environment has been mapped.

As noted above and set forth in more detail below, acquiring optical data may comprise utilizing a source of collimated light, utilizing a source of diffuse light, or both. In some instances set forth herein, the associating comprises compressing a data structure maintaining data representative of the respective one of the plurality of partial maps.

Some disclosed methods of determining a localization of a robot within an operating environment comprise: segmenting the operating environment into a plurality of partial maps; acquiring data related to a distance between the robot and a feature in a portion of the operating environment corresponding to the one of the plurality of partial maps currently occupied by the robot; and computing a location of the robot in accordance with the acquiring. Some such methods further comprise selectively repeating the acquiring and the computing. Acquisition of data may include utilizing a source of collimated light, utilizing a source of diffuse light, or both.

In accordance with another aspect of the present invention, a robot comprises a computer-readable medium encoded with data and instructions for determining a location of the robot in an operating environment; the data and instructions causing the robot to: generate a plurality of particles, each of the plurality of particles having associated hypothesis data representing an hypothesis regarding a position and an inclination of the robot; acquire data related to a perspective of the operating environment from a current location of the robot; compare the data to the hypothesis data associated with at least some of the plurality of particles; and apply a weight to at least some of the plurality of particles in accordance with the comparison of the data and the hypothesis data; wherein a position component of the hypothesis data for each of the plurality of particles is restricted to a subset of locations in the operating environment.

Additional data and instructions may further cause the robot to: increase a weight for one of the plurality of particles when the associated hypothesis data are similar to the data acquired by the robot; and decrease a weight for one of the plurality of particles when the associated hypothesis data are not similar to the data acquired by the robot.

In some embodiments, the data and instructions may further cause the robot to discard those of the plurality of particles having a weight below a discard threshold, clone those of the plurality of particles having a weight above a clone threshold, or both.

The foregoing and other aspects of various embodiments of the present invention will be apparent through examination of the following detailed description thereof in conjunction with the accompanying drawing figures.

BRIEF DESCRIPTION OF THE DRAWING FIGURES

FIG. 2A is a partially exploded bird's eye perspective view of an exemplary embodiment of a multi-function robotic device.

DETAILED DESCRIPTION

Figure 1A:
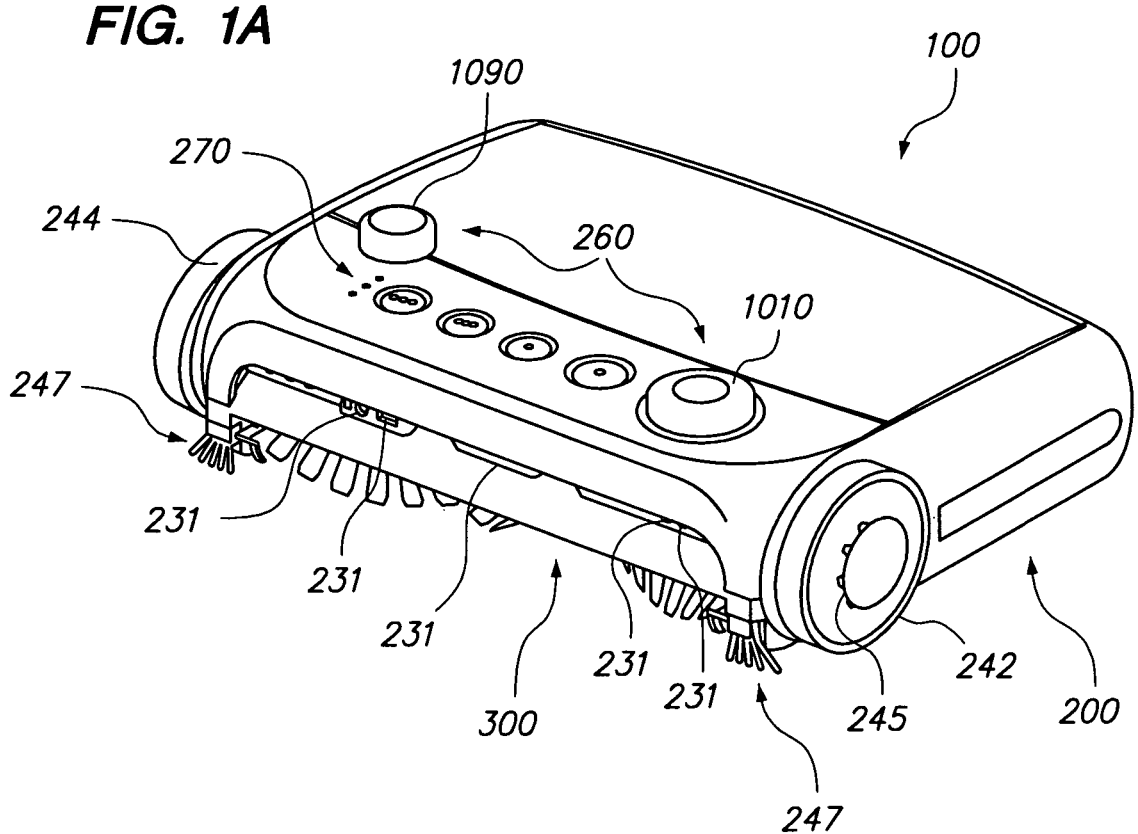
FIG. 1A is a bird's eye perspective view of an exemplary embodiment of a multi-function robotic device.
Figure 1B:
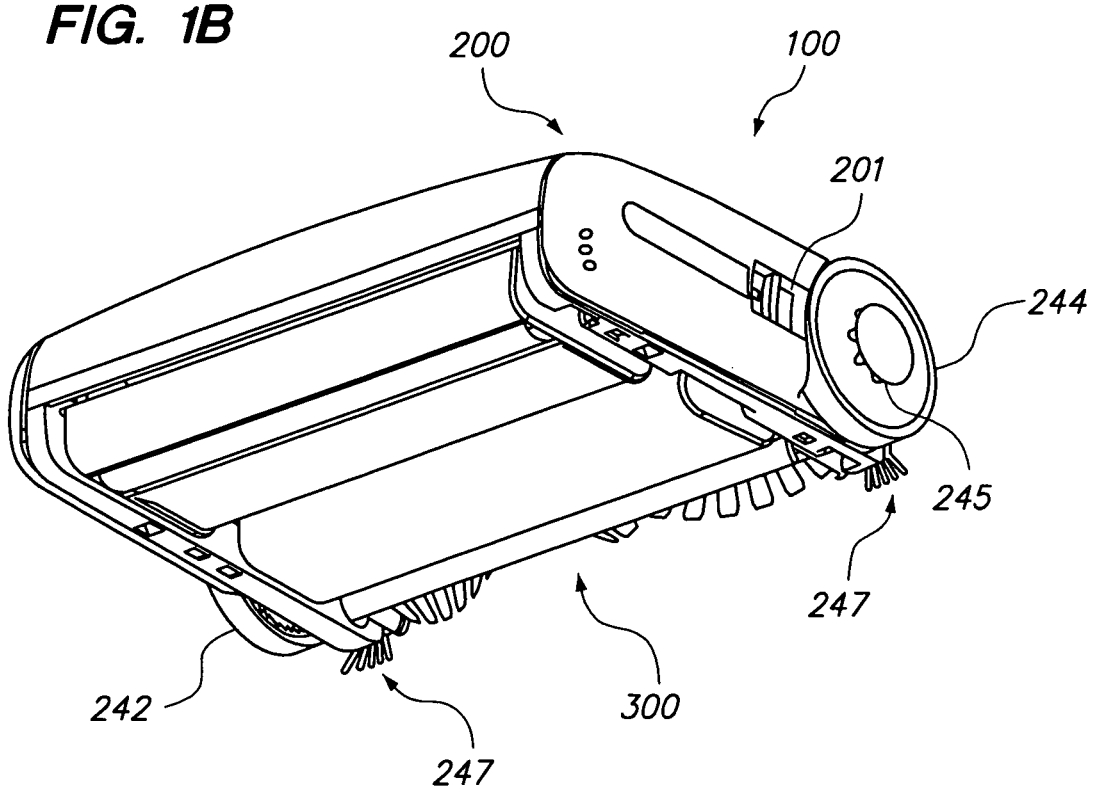
FIG. 1B is a worm's eye perspective view of the multi-function robotic device of FIG. 1A.
Figure 2B:
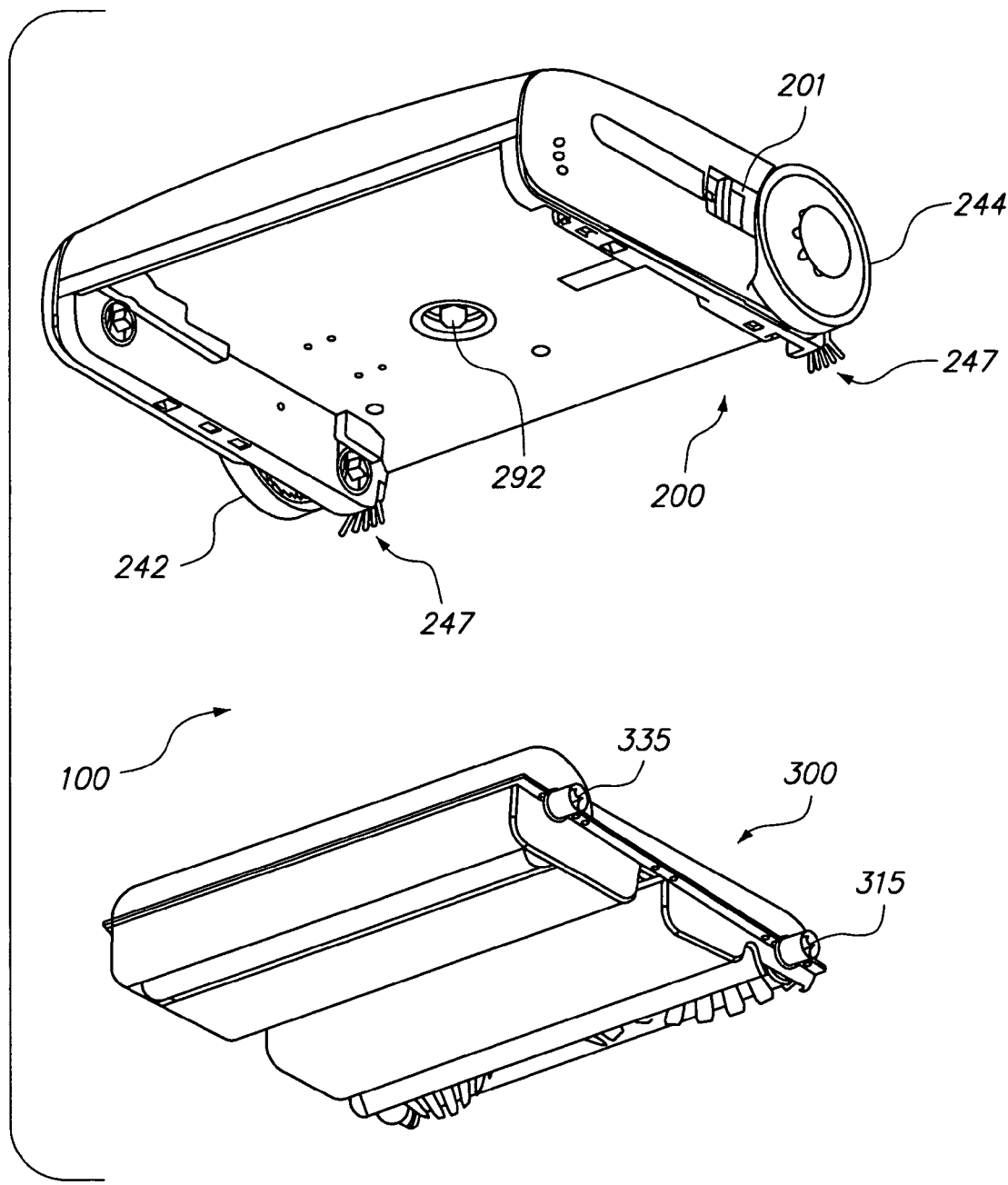
FIG. 2B is a partially exploded worm's eye perspective view of the multi-function robotic device of FIG. 2A.

With reference now to the drawing figures, FIGS. 1A and 1B are bird's eye and worm's eye perspective views, and FIGS. 2A and 2B are bird's eye and worm's eye partially exploded perspective views, of an exemplary embodiment of a multi-function robotic device.

It will be appreciated that a multi-function robotic device ("robot") 100 may generally be characterized by an ability to perform tasks autonomously or automatically with little or no intervention on the part of a user or operator.

In that regard, robot 100 may generally comprise computer hardware and software operative to provide some degree of intelligence and otherwise to control or influence operation of the various electromechanical and other structural elements described below. The overall shape, physical dimensions, structural orientation or arrangement, and operational characteristics of the various components are all susceptible of numerous modifications that will be readily appreciated by those of skill in the relevant art.

Architectural Overview

Figure 3A:
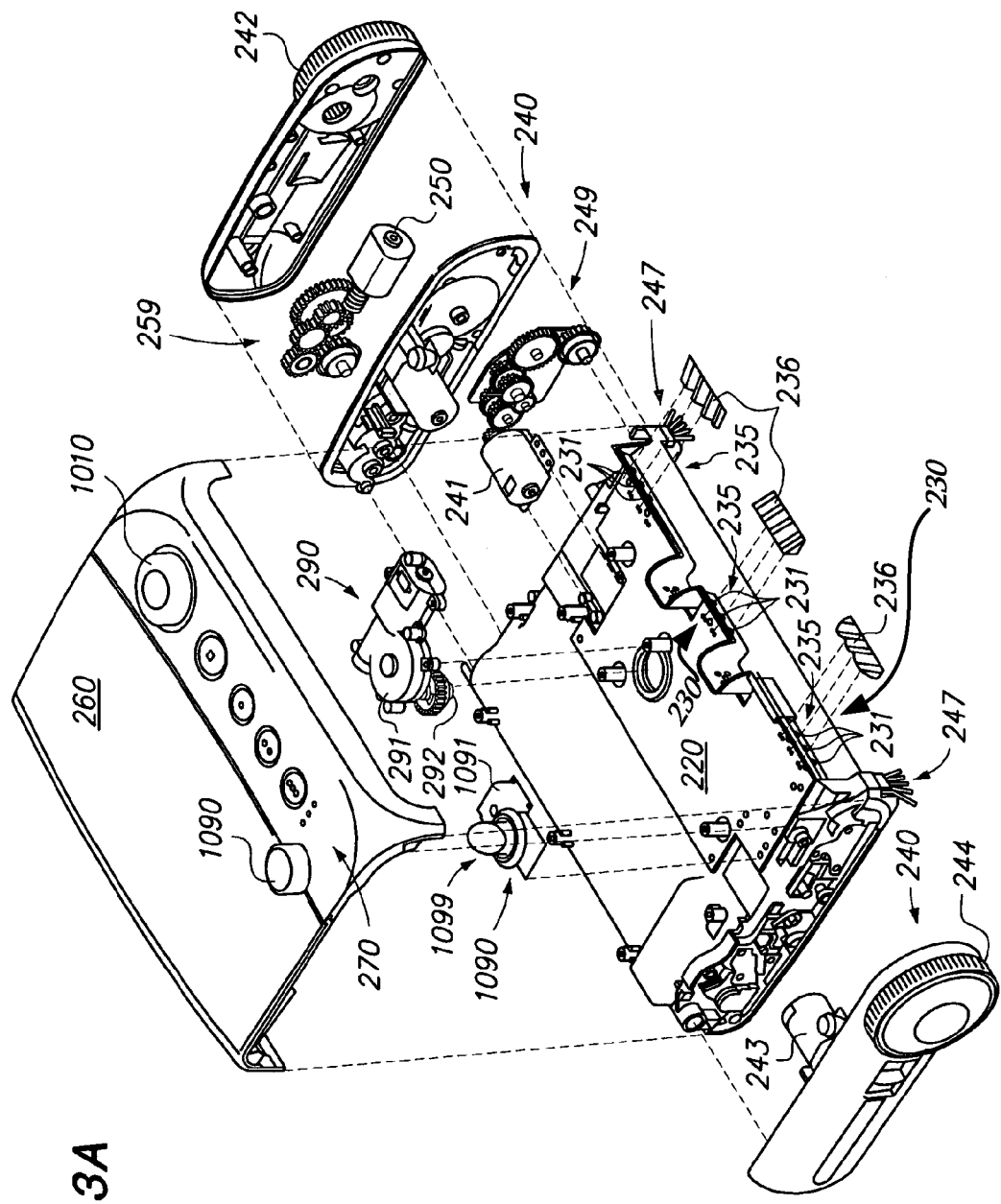
FIG. 3A is a partially exploded perspective view of an exemplary embodiment of a robot body.
Figure 4:
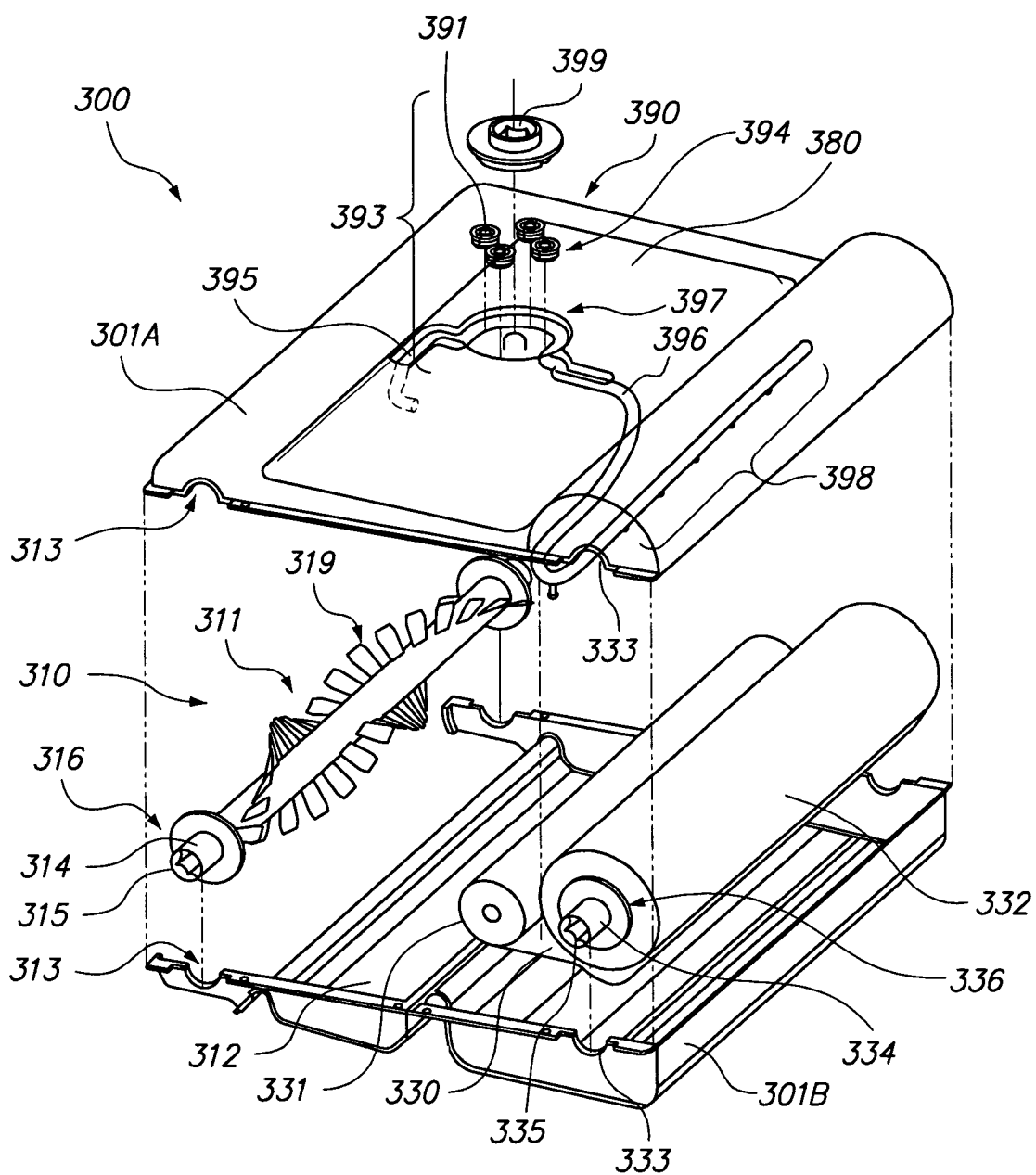
FIG. 4 is a partially exploded perspective view of an exemplary embodiment of an application-specific cartridge designed for use in conjunction with a robot body.
Figure 5A:
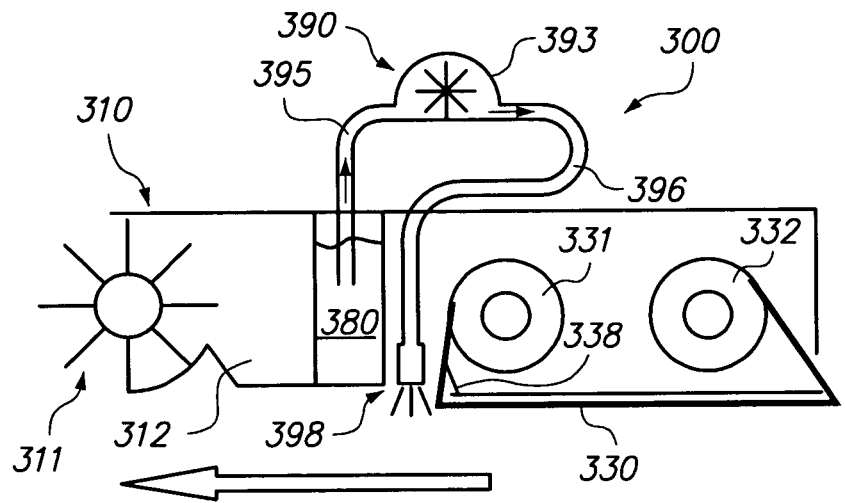
FIG. 5A is a simplified cross-sectional view of an exemplary embodiment of an application-specific cartridge.

As indicated in FIGS. 1A-B and 2A-B, robot 100 generally comprises a body 200 and a functional cartridge 300. FIG. 3A is a partially exploded perspective view of an exemplary embodiment of a robot body. FIG. 4 is a partially exploded perspective view, and FIG. 5A is a simplified cross-sectional view, of exemplary embodiments of an application-specific cartridge designed for use in conjunction with a robot body.

As set forth in more detail below, body 200 may generally be configured and operative to provide motive force to propel robot 100 about an operating environment, such as a floor or other surface to be treated. In that regard, body 200 may include or comprise an electronics module 220, a sensor array 230, a motive drive mechanism 240 (including, for example, motors 241,243 and wheels 242,244), an optical sensor apparatus such as an optical assembly 260, a pump mechanism 290, and one or more additional motors 250 adapted optionally to provide operational power to components of cartridge 300 as described below.

Body 200 also generally may comprise an operator input panel 270. As illustrated in the drawing figures, panel 270 may be embodied in a cluster of buttons that accept input, though panel 270 may comprise alternative structures allowing an operator to interact with robot 100, for example, selectively to turn the power on or off and to input commands or to provide other instructions. In that regard, panel 270 may include a display, such as a liquid crystal display (LCD) or other monitor adapted to display information regarding operating status (e.g., current programming, residual battery charge, time to next cleaning cycle, and so forth); such a display may be touch sensitive, accepting input from an operator. Additionally or alternatively, panel 270 may include a keypad allowing an operator to enter alpha-numeric characters to instruct robot 100 to perform specific tasks, to reconfigure software or firmware, or otherwise to interact with robot 100 to affect or influence its operation. In that regard, input accepted at panel 270 may be transmitted to electronics module 220. Further, it may be desirable to provide panel 270 with a sensor operative to receive signals from a remote control unit (not shown) such as are typically employed to operate consumer electronics devices as generally known in the art. As an alternative, electronics module 220 may receive input from a remote control unit directly, i.e., without requiring intervention of panel 270.

It will be appreciated that various components of body 200 may require electrical power during operation. Accordingly, body 200 may include, or be constructed to interface with, a source of electrical power, such as a disposable or rechargeable battery or series of batteries, either of which may include or be integrated with electronic power management hardware, firmware, or software (e.g., a battery pack or so-called "smart battery"). Additionally or alternatively, fuel cells, solar cells, or large capacitors or series of capacitors may be employed. In some arrangements, body 200 may be configured to receive operating power from an external source, such as through a wire or cable; such an external source may power components during operation, may recharge an internal power supply, or both. Numerous appropriate electrical power supplies and connective hardware are generally known in the art and are not set forth in detail herein. Accordingly, a direct current battery source, an alternating current electrical source, power source interface hardware, as well as any attendant transformers and internal power wiring, have been omitted from the drawing figures for clarity. It will be appreciated that a robust and flexible power supply and management system may be implemented without inventive faculty, and that the illustrative embodiments are not intended to be limited to any particular power sources nor to any specific electrical power management strategies.

Additionally, body 200 may include a cartridge engagement mechanism (not shown in the drawing figures for clarity) configured and operative to interoperate with cooperating structural elements of functional cartridge 300 such that cartridge 300 may be selectively inserted into, or otherwise physically engaged with, body 200. Those of skill in the art will appreciate that various coupling and detention mechanisms may be suitable operatively to engage cartridge 300 with body 200 in a secure manner. Examples of cooperating mechanisms include, but are not limited to: tab and slot arrangements; protuberances designed to slide along tracks or guide rails; and hinged mechanisms. Such engagement mechanisms may additionally include a button, tab, knob, slidable latch, or other release mechanism (reference numeral 201 in FIGS. 1B and 2B) operative to release cartridge 300 from its engagement with body 200. The present disclosure is not intended to be limited to any particular engagement and release technology, nor to other selective attachment strategies, that may be employed to couple cartridge 300 with body 200, provided the engagement mechanism accommodates mechanical and any necessary or desired electrical connections appropriate to enable or otherwise to facilitate operation of components carried by or disposed in cartridge 300 as set forth below.

In particular, body 200 and cartridge 300 may be constructed to interconnect such that necessary or desired mechanical and electrical connections facilitating functionality of various components of cartridge 300 may be made automatically upon proper engagement with body 200. When so interconnected, cartridge 300 and body 200 may be referred to as operably coupled. In operation, body 200 may selectively position an engaged cartridge 300 at a desired or random location in the operating environment, for example, as a function of, or otherwise in accordance with, instructions or recommendations provided by electronics module 220.

Electronics module 220 may generally comprise suitable electronics or electrical components sufficient to provide necessary or desired control functions for robot 100. In that regard, electronics module 220 may be embodied in or otherwise comprise one or more programmable computer processors, microcomputers, microcontrollers, or other hardware elements, that are suitably programmable or otherwise configurable to enable some or all of the navigational and other functionality described below. By way of example, electronics module 220 may include or be implemented as a microprocessor, an application specific integrated circuit (ASIC), a programmable logic controller (PLC), an arrangement of field programmable gate arrays (FPGA), or any other type of processor or addressable memory capable of providing instructions to influence the behavior of robot 100 or its components. As is generally known in the art, electronics module 220 may incorporate or otherwise have access to volatile memory, non-volatile memory, or a combination of both (not shown in the drawing figures for clarity).

Electronics module 220 may additionally include a communications port, such as a wired (e.g., FIREWIRE or Universal Serial Bus (USB)) or wireless (e.g., BLUETOOTH or the IEEE 802.11 (WiFi) standard) communications port to enable or otherwise to facilitate reprogramming or reconfiguration of software or firmware incorporated into or accessible by electronics module 220. Alternatively, electronics module 220 may be implemented as a removable (i.e., replaceable) card or module, enabling easy updating or reconfiguring of hardware and software functionality. Additionally or alternatively, the memory (volatile or non-volatile) to which electronics module 220 has access may comprise or be implemented as a replaceable card or memory module.

In some embodiments, electronics module 220 may incorporate or have access to a radio frequency (RF) receiver to detect signals issuing from devices equipped with or attached to an appropriate RF transmitter. For convenience of an operator, electronics module 220 may be programmed or instructed to identify the source of an RF signal or beacon emanating from a transmitter attached to a key chain, for example, or from a transmitting tag adhered to a wireless telephone or some other item. When so configured, a robot 100 with an electronics module 220 having such capabilities may assist an operator in finding a lost wallet, key chain, purse, or any other item carrying an RF transmitter, which may be packaged with robot 100 or sold as an optional accessory.

Sensor array 230 may generally comprise one or more sensors 231 or sensor clusters 235 that are operative to sense aspects of the operating environment in which robot 100 is employed. In that regard, sensor array 230 may acquire useful information regarding physical structures disposed in the operating environment and transmit that information to electronics module 220 for processing or other analysis. In this manner, sensor array 230 may function as a "proximity detector," for example, allowing robot 100 to avoid obstacles while covering unobstructed portions of the operating environment efficiently.

It will be appreciated that some embodiments of robot 100 may have utility as cleaning apparatus in dusty or otherwise unsanitary operating environments; accordingly, sensors 231 may be positioned on body 200 in such a way as to remain as clean and unobstructed as possible during use. As illustrated in FIGS. 1A and 2A, sensor clusters 235 may be positioned high above the surface to be treated in order to minimize the likelihood that sensors 231 may suffer deteriorating performance due to particulate or other contamination. In that regard, sensors 231 may be further protected from damage and dirt, for example, by covers, louvers, or some other protective structure, such as a plastic or acrylic window, for example. It will be appreciated that such a protective element should not prevent operation of sensors 231, and may be constructed of material that allows signals to and from sensors 231 to pass substantially unattenuated. The material used for such structures may be selected in accordance with the particular sensing technology employed.

A sensor 231 may be embodied in any of a number of sensing structures or hardware elements. As is generally known in the art, sensor 231 may be designed to be sensitive to electromagnetic energy in a selected frequency band, e.g., RF, infrared (IR), ultraviolet (UV), microwave, etc. Alternative sensing technology, such as may employ ultrasonic waves, for example, may be implemented by sensor 231. In more sophisticated systems with sufficient data processing resources, for example, sensor 231 may be characterized by an optical or video sensor.

Where the relative position and spatial orientation of sensors 231 or sensor clusters 235 are known and recorded or otherwise stored in electronics module 220, sensor array 230 may facilitate accurate positioning and navigation of robot 100. In that regard, positional and navigational processing may be executed by electronics module 220 taking into consideration both the known geometry of sensors 231 relative to each other as well as the nature and timing of signals provided to electronics module 220 by a combination of sensors 231 or clusters 235. With respect to location, sensor positioners (reference numeral 236) may be employed to retain each sensor 231 within a cluster 235 in a desired orientation. Where windows or other protective components are employed to prevent soiling of sensors 231 as described above, these structures may generally be situated outboard of positioners 236.

It will be appreciated that each individual sensor 231 in sensor array 230 may be coupled to electronics module 220 such that signals may be transmitted to a processor or other computer hardware; additionally or alternatively, sensor clusters 235 may be coupled to electronics module 220 in a similar fashion. Signals from a cluster 235 may be transmitted to electronics module 220 in the form of discrete signals for each sensor 231 in cluster 235, for example, or as a composite signal from more than one sensor 231 in cluster 235. In some embodiments, individual sensors 231 in a particular cluster 235 need not be of the same type nor employ the same technology. For example, a sensor cluster 235 may employ an RF sensor in one position and an IR sensor in another position. Various combinations of disparate sensor technologies may have particular utility for particular applications.

Figure 3B:
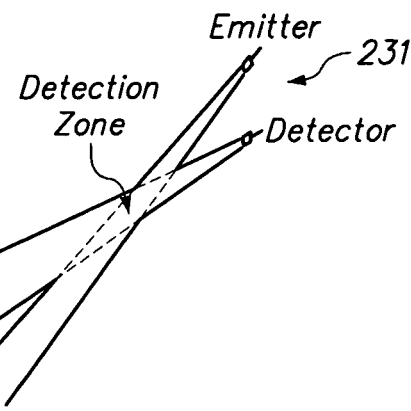
FIGS. 3B-3D are simplified diagrams illustrating a side view of one embodiment of a sensor geometry employed by a sensor array.
Figure 3C:
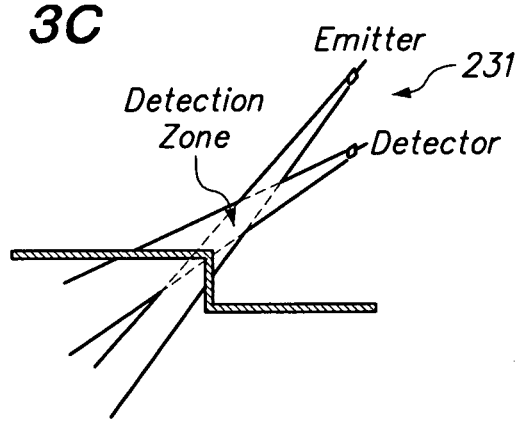
Figure 3D:
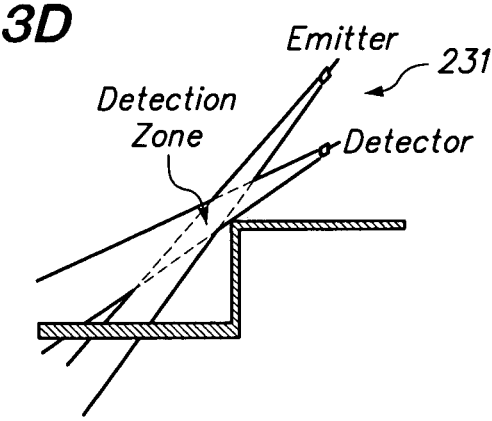

FIGS. 3B-3D are simplified diagrams illustrating a side view of one embodiment of a sensor geometry employed by a sensor array. The emitters and detectors depicted in the drawing figures may be fixed by positioners 236 to create the illustrated zone of detection.

A proximity sensor system comprising sensor array 230 may provide or facilitate collision-avoidance functionality for robot 100. In the illustrated embodiment, elements of sensor array 230 utilize intersecting cones to create a detection zone at a desired or appropriate location relative to body 200. It will be appreciated that the location of the detection zone relative to body 200 may be affected by the relative angle at which the emitter and detector are retained by positioners 236, and that a desired or optimal location of this zone may be influenced by many factors including, but not limited to, the range of the sensing technology employed, the expected maximum velocity of robot 100, the size and nature of obstacles or structures disposed in the operating environment, and so forth.

An emitter may be an IR light emitting diode (LED) or other source, as generally known in the art. Depending upon the technology employed at the emitter, an appropriate detector may be selected to have a peak sensitivity to match the wavelength of the output provided by the emitter. In operation, as indicated in FIG. 3B, the emitter may cast a cone of light at an angle that intersects the cone of detection for the detector. Within this 3-dimensional region of intersection, the emitter will generally illuminate one or more surfaces of any object, and reflected or diffuse light will be directly visible or otherwise observable to detector. Accordingly, these sensor 231 components of sensor array 230 may provide electronics module 220 with data indicative of a positive detection of an object or surface within a known proximity to body 200. By arranging multiple emitters and detectors on body 200 of robot 100 as indicated in FIG. 3A, for example, various zones of detection may be selectively created to detect obstacles and other potential hazards that may impede or prevent safe navigation.

By employing a known, fixed geometry to create a zone of detection in a known location and orientation relative to body 200, the exemplary approach can employ a simple, binary detection scheme, i.e., a signal output by the detector may toggle from zero to non-zero (or vice-versa) to indicate a detection. To facilitate this, the geometry illustrated in FIG. 3B-3D utilizes a cone of illumination (for the emitter) and a cone of detection (for the detector) disposed at an oblique angle such that the cones overlap minimally, and in a predetermined location. The geometry may be fine-tuned such that even a very small rise, precipice, or other change in elevation of a surface causes the reflection observed by the detector to go from zero to non-zero (or vice-versa); an output signal may be toggled accordingly, indicating to electronics module 220 that a sensor 231 has made a detection. In one exemplary implementation, this geometry may enable sensor 231 to detect obstacles or other items of ¼ inch in height or less; sensor 231 may detect the presence of a low rug on a hard floor, for instance. Because the light observed by the detector is either zero or non-zero (depending upon whether a surface or object is in the zone of detection at a known location), and because the signal output by the detector can accordingly be toggled between zero and non-zero, the exemplary approach need not rely upon measuring or otherwise quantifying an intensity of detected light to estimate a distance to an object or obstacle illuminated by the emitter. Accordingly, performance of sensor array 230 may be less susceptible to variations in surface color, texture, and other characteristics of the illuminated object that might otherwise have deleterious effects on sensor 231 accuracy.

As robot 100 navigates within the operating environment, any object encountered in a zone of detection will present sensor 231 with a surface that may be detected. The exemplary geometry allows a broad range of angles of incidence (with respect to an illuminated surface) through which sensor 231 may function without loss of effectiveness; a surface in virtually any orientation relative to sensor 231 may be detected. Similarly, even objects that have highly variable surface features or textures, or that are otherwise geometrically or characteristically irregular, may nevertheless be identified by sensor 231, yielding a signal that may be reported to electronics module 220, for example, or otherwise transmitted for appropriate processing. As indicated in FIG. 3C, both the horizontal and vertical surfaces of a step provide potential target surfaces that may be illuminated by the emitter and, consequently, reflect incident light for the detector to register. In some embodiments, the elevation (or vertical registration) of the zone of detection may be initialized, programmed, or otherwise physically adjusted (such as by positioners 236) to enable detection of an obstacle whose height is beyond the climbing capabilities of robot 100. In some instances, it may be desirable not to detect objects having vertical dimensions below such a threshold; alternatively, such objects may be detected by sensors 231 but ignored by electronics module 220. In one exemplary embodiment where robot 100 is capable of clearing obstacles having a height of ¼ inch, zones of detection may be suitably sized and oriented such that sensors 231 do not detect objects lower than this height.

In addition to detecting physical structures that may be characterized as obstacles, it may be useful to detect the absence of structure as well. For example, the exemplary geometry for sensors 231 facilitates detection of the disappearance of a surface, such as at a precipice. In some instances, a precipice may be defined as a step down having a vertical dimension that exceeds the climbing capabilities of robot 100. As illustrated in FIG. 3D, the geometric arrangement of the emitter and the detector may generally provide constant or continuous detection of a surface at the same elevation as the bottom of wheels 242,244; i.e., sensors 231 may detect the surface upon which robot 100 is disposed. In some embodiments, the zone of detection may be suitably sized and oriented to project vertically only to the extent to which robot 100 has the capacity to descend. When so arranged, sensors 231 may detect any sudden drop in elevation beyond this threshold; such a precipice will generally result in a loss of signal from the detector. Such a loss of signal may be reported to electronics module 220, which may instruct body 200 regarding course correction or other measures to prevent damage to robot 100. The foregoing precipice detection principle may also be applied laterally or horizontally, in which case detections by sensors 231 may enable robot 100 to maintain a consistent distance from a wall, for instance, even at locations where the wall turns sharply away.

As noted above, the exemplary geometry for sensors 231 illustrated in FIGS. 3B-3D may enable accurate detection of obstacles and precipices without requiring quantification of the intensity of the signal observed by the detector. Whereas texture, reflectivity, color, geometrical irregularities, or a combination of these factors, can adversely affect the accuracy of some sensing technologies, the illustrated embodiment may reduce or minimize errors associated with detections or distance measurements that are typically introduced by such factors.

As noted above, motive drive mechanism 240 may include, by way of example, a respective motor 241,243 for each respective wheel 242,244. It will be appreciated that alternative mechanical arrangements may be equally suitable to propel robot 100 in a desired fashion. For instance, a "caterpillar" or other tractor mechanism generally comprising drive wheels and treads may provide motive force for robot 100, and may provide greater traction in some implementations. Additionally or alternatively, multiple drive axles, some or all of which may include steerable wheels, or other more complex steering linkages or gearing assemblies may be appropriate for some applications.

In one exemplary embodiment, drive mechanism 240 may provide simple directional control, for example, by driving each of wheels 242,244 at a different speed or in a different direction; a tractor drive works in a similar fashion, driving the individual treads independently at different rates or in different directions to produce rotation about an axis. In operation, motor 241 may independently drive wheel 242 at a specified speed and direction responsive to, for example, control signals transmitted from electronics module 220; similarly, motor 243 may independently drive wheel 244 responsive to signals provided by electronics module 220. With such an independent drive strategy, accurate control of motion for robot 100 may be achieved with relatively inexpensive parts and without complicated steering mechanisms, though more intricate and expensive drive and steering systems may be desirable for some demanding applications or in situations where cost constraints are relaxed. In some instances, it may be desirable for motors 241 and 243 to include or to have access to an electronic controller, such as a microcomputer or PLC, for example, to facilitate control of motor speed or torque output.

Motors 241 and 243 may generally be characterized by electrical brush motors, such as are generally known in the art, and similar devices. By way of example, one commercially available motor that may be suitable is a model FC-280PA-20150 (marketed by Mabuchi Motor Co., Ltd.) which is a medium speed, high torque, high efficiency carbon brush motor. Various types of stepper motors, induction motors, and other electrical drive apparatus for producing mechanical torque or other drive force from an electric power source are known in the art and may be suitable for certain implementations. As set forth in more detail below, motors 241 and 243 may additionally be operative to drive components of cartridge 300, for example, through a mechanical interface 249 designed to engage cooperating structures integral with or attached to cartridge 300.

Drive mechanism 240 may additionally include wheel brushes 247. During operation of robot 100, wheel brushes 247 may prevent wheels 242,244 from catching on debris or other items which may prevent rotation. In that regard, brushes 247 operate to clear such debris as robot 100 proceeds, and may be angled to deflect any material in the path of wheels 242,244 inward (i.e., toward the center of robot 100) to facilitate collection or removal, such as by a brush roller or other sweeping apparatus.

In combination, sensor array 230 and drive mechanism 240, operating in conjunction with or under control of electronics module 220, may enable robot 100 to navigate about an operating environment with precision, while avoiding obstacles and ensuring that the entire operating environment is treated systematically and efficiently. For example, signals from one or more sensors 231 may indicate to electronics module 220 that robot 100 is nearing a precipice (e.g., such as a step down or a hole in the surface being treated), a fixture, or some other obstacle such as a rug or carpet. After suitable processing, for example, based upon the speed at which robot 100 is traveling and an estimation of its angular orientation relative to the obstacle (e.g., based upon multiple readings from sensors 231 and knowledge of relative positions and orientation of sensors 231 disposed on body 200), electronics module 220 may provide appropriate signals to drive mechanism 240, slowing or speeding one or both of motors 241 and 243 as necessary or desired for obstacle avoidance. In that regard, optical assembly 260 may also provide useful input regarding the operating environment to electronics module 220.

In some embodiments, optical assembly 260 generally comprises an optical sensor apparatus suitable for acquiring optical data; in this context, the term "optical" includes, but is not limited to, visual data. In that regard, optical assembly 260 may include a charge-coupled device (CCD), a complimentary metal-oxide semiconductor (CMOS) sensor, or any of various other types of image sensor apparatus which may be sensitive to selected frequencies or frequency bands in the electromagnetic spectrum. Details of the structure and operation of optical assembly 260 are provided below with specific reference to FIGS. 10 through 17.

Pump drive mechanism 290 may generally comprise a pump motor 291 and a drive shaft 292 that is operative to couple with a cooperating structure disposed on cartridge 300 (such as pump drive mechanism 390 described below) upon proper engagement of cartridge 300 with body 200. In some embodiments, shaft 292 may be countersunk or otherwise disposed within a recess (e.g., as illustrated in FIG. 2B); in the foregoing manner, shaft 292 may be so dimensioned and positioned as not to make contact with, nor to prevent proper installation of, embodiments of cartridge 300 that do not require mechanical coupling to pump drive mechanism 290. Pump motor 291 may be operative under control of electronics module 220 selectively to turn shaft 292 in accordance with task requirements and the particular operating characteristics of the cooperating pump drive mechanism 390 (which may be application-specific) employed by cartridge 300 as set forth in more detail below.

Pump motor 291 may be any of the types of motor technologies described above with reference to drive motors 241 and 243. Various embodiments including brush motors, stepper motors, induction motors, and the like, may be suitable, provided that pump motor 291 is sufficiently responsive to signals from electronics module 220 to satisfy the demands of the application with which robot 100 is tasked.

As described briefly above, body 200 may include one or more motors 250 configured and disposed in such a manner as to provide operative power to functional components of cartridge 300. For example, a motor 250 may be operative to engage, such as through a gearing mechanism or a drive shaft, for example, a cooperating structure on cartridge 300 that is coupled to a vacuum pump, a beater bar, or both. Similarly, motor 250 may be employed to power a take-up roller for cleaning pad material disposed in cartridge 300 as described below. Additionally or alternatively, some components of cartridge 300 may be driven by drive motors 241 and 243, for example, through gearing assemblies designed to provide appropriate or desired torque to cooperating gears or other structures on cartridge as described below.

By providing motor 250 in body 200 (where electrical power and electronic control elements are readily available) while maintaining the mechanical elements of functional cleaning systems in cartridge 300, duplication of battery packs and other system components may be eliminated or minimized; additionally, this architecture allows a broad range of simplified functional cartridges 300 that may be employed in conjunction with a body 200 having greater capabilities and flexibility. In some embodiments, for example, cartridge 300 may be so simple—and may be constructed of such inexpensive parts—that cartridge 300 may be treated as disposable. On the other hand, in some circumstances, such as where expensive motors, batteries and power management hardware, and other circuitry are carried by cartridge 300 itself, it may not be desirable to discard cartridge 300 after use.

Given the foregoing, it will be appreciated that an exemplary embodiment of body 200 may be characterized as generic or "functionally agnostic", i.e., the components of body 200 may be constructed, dimensioned, and spatially oriented without regard for any specific application or task for which robot 100 is or may be intended. Conversely, cartridge 300 may be constructed with components or structural elements that are application-specific. Given this distributed architecture, the overall functionality of robot 100 may be established or otherwise defined by the nature of the functional cartridge 300 that is engaged with body 200. For example, cartridge 300 may be designed and operative to provide wet cleaning functionality for a hard surface (e.g., mopping functionality); in this case, the structural cooperation between body 200 and cartridge 300 may cause or enable components of cartridge 300 to collect dry debris, to lay down a cleaning solution, and to swab the cleaning solution such that robot 100 operates as an autonomous wet mop device. Alternatively, cartridge 300 may be designed and operative to provide dry cleaning functionality for a soft or piled surface (e.g., vacuuming functionality); in this case, the structural cooperation between body 200 and cartridge 300 may cause or enable components of cartridge 300 to beat the surface (dislodging dust and dry debris), and to suction dislodged debris into a collection container such that robot 100 operates as an autonomous vacuuming device. In both cases, and in others set forth herein, the structural design, orientation, and operating characteristics of body 200 and its various components may remain unchanged, though it is contemplated that the instructions provided by electronics module 220 may vary in accordance with the particular application for which robot 100 is employed.

Turning now to cartridge 300, FIG. 4 is a partially exploded perspective view, and FIG. 5A is a simplified cross-sectional view, of exemplary embodiments that comprise similar features. As indicated in FIGS. 4 and 5A, cartridge 300 may combine, in a single convenient package, several functionalities that are required or desired for both floor sweeping and mopping operations. Operative components of cartridge 300 may be housed within a housing which, as best illustrated in FIG. 4, may comprise shell portions 301A and 301B. Shell portions 301A and 301B may be manufactured of any suitably rigid material to withstand torque and other stresses applied during operation. It will be appreciated that a broad range of materials may be appropriate. Metals such as aluminum, stainless steel, or various copper alloys, for example, may be desirable for use in demanding applications, whereas plastics, polyvinyl chloride (PVC), or acrylics may be desirable for other applications. In disposable embodiments, for example, shell portions 301A and 301B may comprise or be constructed entirely of thin vacuum formed plastic or waxed or otherwise treated cardboard.

In an exemplary embodiment, one portion of cartridge 300 generally includes a sweeping device 310. As indicated in the drawing figures, sweeping device 310 may comprise a brush roller 311, and a debris cavity or receptacle 312; together, these components may be designed and operative to collect loose dust and debris from a floor or other substantially planar or other surface. Removal of dust and other loose debris may be useful to prepare or to "prime" a surface that is to be wet treated for thorough cleaning (in that regard, it is noted that normal direction of travel of robot 100 is indicated by an arrow in FIG. 5A). Alternatively, sweeping device 310 may comprise a simple beam, "squeegee" wiper, or similar structural wiping element (not illustrated in the drawing figures) that is operative to collect dust or other loose, dry debris into receptacle 312. In some embodiments, receptacle 312 may comprise a removable or selectively closable cover, preventing its contents from being spilled or otherwise released unintentionally. Various structures may be utilized to facilitate retention of the contents of receptacle 312. For example, a hinged or sliding plate (not shown in the drawing figures) may be utilized between brush roller 311 and receptacle 312. Such a plate may be spring-biased or otherwise constructed to remain in a closed position (i.e., sealing receptacle 312) when brush roller 311 is not operating. When brush roller 311 turns, the plate may be moved to an open position (e.g., such as by hinges or slide rails), allowing debris cast by dust roller 312 to enter receptacle 312.

Figure 7A:
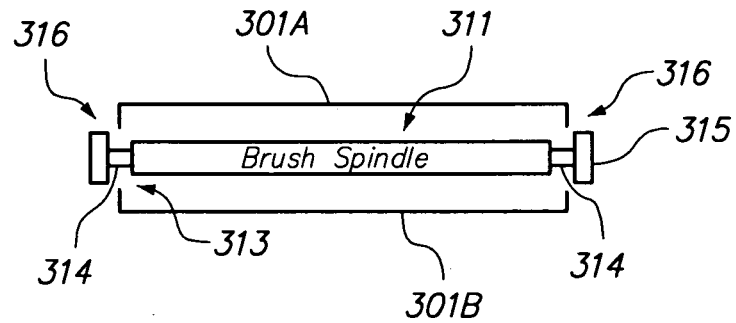
FIGS. 7A-7C are simplified diagrams illustrating exemplary embodiments of a brush roller assembly.
Figure 7B:
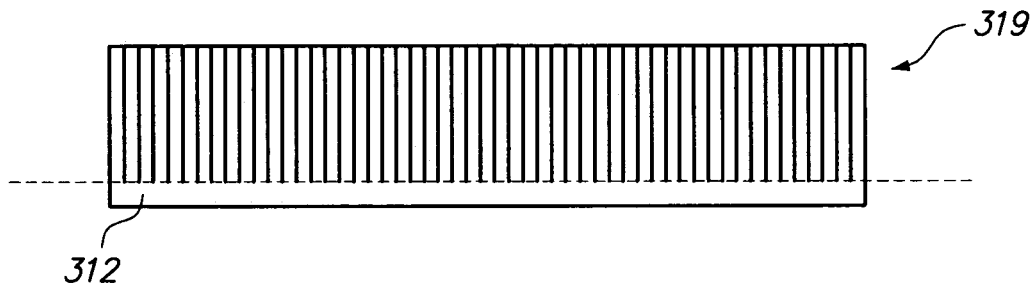
Figure 7C:
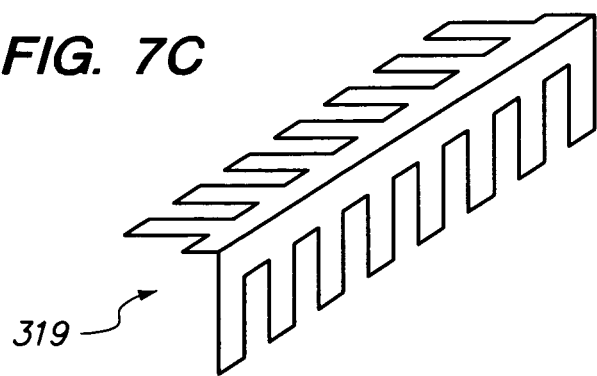

FIGS. 7A-7C are simplified diagrams illustrating exemplary embodiments of a brush roller assembly that may have utility in an embodiment of sweeping device 310. As best illustrated in FIGS. 4 and 7A, brush roller 311 may include end portions 316 that extend through apertures 313 in shell portions 301A and 301B. In some embodiments, brush roller 311 may fit loosely within shell portions 301A and 301B, i.e., apertures 313 may not require tight tolerances with respect to a bearing surface 314, providing that sufficient clearance accommodates proper engagement of end portions 316 with an interface structure on body 200 as set forth below. Alternatively, it may be desirable to ensure that end portions 316 are precisely aligned with apertures 313; some sophisticated embodiments may employ ball bearing assemblies, for example, or other structures to facilitate a tight fit while allowing brush roller 311 to rotate freely.

In one embodiment, end portions 316 are designed to engage an interface 249 associated with drive mechanism 240 upon proper insertion of cartridge 300 with body 200. In the embodiment illustrated in FIG. 3A, interface 249 comprises a gearing mechanism that is driven by a motor 241,243. Accordingly, end portions 316 may comprise a gear 315 or other structure that is operative to engage a gear on interface 249. In operation, gear 315 transmits torque to end portions 316, causing brush roller 311 to rotate.

A gearing mechanism may be suitable for some applications of interface 249, particularly where torque reduction is desired, for example. Alternatively, simpler mechanical connections, such as simple drive shafts or belt or chain drives may be employed. It will also be appreciated that, irrespective of any gearing mechanisms employed internally by interface 249, proper engagement of end portions 316 with interface 249 may not require gear 315 integrated with or attached to end portions 316 themselves. For example, secure engagement may be accomplished by inserting a tapered cone or other appropriately shaped protruding structure from interface 249 into a receptacle (aligned with the rotational axis of brush roller 311) at end portion 316. Where a structure on interface 249 is designed for insertion into a receptacle or other cooperating structure of end portion 316, it may be desirable to spring-load the structure of interface 249 so designed. In such embodiments, a spring, bushing, or other biasing element may allow secure engagement of end portion 316 during use, while also providing sufficient pliancy, or "give", to allow insertion of interface 249 structure, and removal thereof, without requiring excessive or undue force, such as may damage components of interface 249 or end portions 316. Alternatively, rubber drive wheels or other friction-based systems may be employed to transmit rotation to end portions 316.

Though the foregoing example addresses a situation in which brush roller 311 is driven through interface 249 by drive mechanism 240, brush roller 311 may alternatively be driven by an independent motor 250 as described above. In such an alternative arrangement, gearing by the interface, as well as the mechanism by which that interface engages end portions 316, may be implemented substantially as set forth above.

In some disposable embodiments of cartridge 300, it may be desirable to construct brush roller 311 using inexpensive materials. One such embodiment of brush roller 311 may employ a very simple brush 319 constructed out of sheet material as illustrated in FIG. 7B. In the illustration, each vertical line represents a cut in a sheet of material; a strip of the material (indicated by reference numeral 312), may remain intact, allowing this portion to be attached to a spindle or roller. Once constructed, brush 319 may be glued, for example, or otherwise adhered or attached (such as at strip 312) to a cardboard or plastic tube in a spiral or helical pattern, for example, or simply in rows along a rotational axis. Where strip 312 on brush 319 is fabricated of rubber or other sufficiently flexible material, dimples or other protuberances may be integrated with strip 312 in a predetermined pattern or arrangement designed to engage holes or depressions drilled or otherwise machined into a rod or spindle. It will be appreciated that other methods may be employed to attach brush 319 to a spindle or other rotating element.

In an alternative embodiment illustrated in FIG. 7C, brush 319 is constructed using an "L"-shaped piece of material having selected regions cut away. Two such elements may be interlocked. Alternatively, one or more brushes 319 having the illustrated shape may be attached annularly to a shaft, tube, or other rotating element.

Suitable materials for the embodiments depicted in FIGS. 7B and 7C include, but are not limited to, thin plastic and wax-coated or otherwise appropriately treated cardboard; any inexpensive material having desired strength and flexibility characteristics may be employed.

It will be appreciated that many brushes, whether intended to be disposable or not, are formed using a relatively expensive process in which bristles are inserted a tuft at a time into a frame, which may be plastic or wood. Typical floor-cleaning brushes (such as are found in vacuum cleaners, for example) usually comprise a spindle made of thick plastic or wood, and similarly have tufts that are inserted by special machines. Some embodiments of cartridge 300 that are not necessarily intended to be disposable may employ a brush roller 311 that is more like a typical vacuum beater bar brush than the embodiments illustrated in FIGS. 7B and 7C. In these more robust implementations, bristles or tufts may be made of nylon, plastic, or other materials generally known in the art.

Returning now to FIGS. 4 and 5A, another portion of cartridge 300, disposed aft of sweeping device 310 in the drawing figures, may generally include a fluid reservoir 380 and pump drive mechanism 390. In the illustrated embodiments, a pump 393 incorporated into or operatively coupled to pump drive mechanism 390 may force a liquid, such as water or a cleaning solution, for example, from reservoir 380 onto a floor or other surface to be treated. As described above, pump drive mechanism 390 may be designed and operative to receive or otherwise to couple with shaft 292 of pump drive mechanism 290 integrated with body 200. In operation, shaft 292 engages a cooperating (receptacle) structure 399 integral with pump drive mechanism 390; shaft 292 (powered by pump motor 291 as described above) may drive pump 393 as set forth below.

Figure 6:
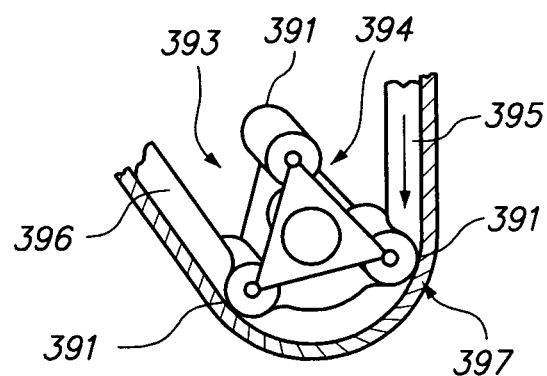
FIG. 6 is a simplified diagram illustrating an exemplary embodiment of a peristaltic pumping mechanism.

In some situations, it may be desirable to extract liquid from reservoir 380 in a way that enables selective engagement and disengagement of cartridge 300 and body 200 while minimizing leaks or spills of liquid. In that regard, pump 393 may be embodied in or comprise a peristaltic pump, as best illustrated in FIGS. 4 and 6, where FIG. 6 is a simplified diagram illustrating an exemplary embodiment of a peristaltic pumping mechanism.

By way of background, peristaltic pumping provides a variety of benefits in some implementations of cartridge 300. The technology is generally inexpensive, making disposable versions of cartridge 300 feasible. Additionally, a peristaltic pump acts as a valve, sealing off any liquid remaining in reservoir 380 upon removal of cartridge 300 from body 200. Also, the technology is amenable to the automatic engagement strategies set forth herein; accordingly, neither pump installation, mechanical connection, priming, nor other intervention by an operator is required.

As is known in the art, a peristaltic pump generally comprises an impellor assembly 394 and a respective length of tubing on the upstream side and the downstream side (indicated by reference numerals 395 and 396, respectively).

Impellor assembly 394 compresses a flexible conduit (such as in the region indicated by reference numeral 397, for example) in successive stages, drawing pumped material in and moving it downstream through successive squeezing actions. A feed conduit 395, fluidly coupled with reservoir 380, may feed pump 393 during use. In operation, a series of rollers 391 associated with impellor assembly 394 may serve to compress conduit section 397, providing necessary suction to draw liquid from reservoir 380 through feed conduit 395. Pumped liquid passes impellor assembly 394 and may be forced under hydrostatic pressure through an output conduit 396 to a dispensing section 398. Dispensing section 398 may employ one or more nozzles or nozzle assemblies; additionally or alternatively, dispensing section 398 may simply be embodied in a close-ended section of conduit with one or more drip holes operative to release pumped liquid in a desired pattern. As noted briefly above, dispensing section 398 may deposit a liquid directly onto a surface to be treated, for example, or onto a section of pad 330 employed to swab the surface to be treated. Those of skill in the art will appreciate that the configuration and construction of dispensing section 398 are susceptible of various modifications, and may be influenced by, for example, the type and viscosity of liquid maintained in reservoir 380, the flow rate provided by impellor assembly 394, the speed at which robot 100 is traveling, the specific task assigned as directed by electronics module 220, and other factors.

Necessary or desired rotation of impellor assembly 394 may be facilitated through proper engagement of pump drive mechanisms 390 and 290, as well as by the structural cooperation of shaft 292 and receptacle 399; rotation may be enabled and suitably controlled by pump motor 291 operating in response to signals from electronics module 220. It will be appreciated that various types of peristaltic or other pumps may be employed as a function of operational requirements, form factor restrictions, and other considerations. For example, impellor assembly 394 may employ a simple and inexpensive structure that employs small "fingers" or other protuberances to compress conduit section 397, rather than a series of rollers 391 such as illustrated in the drawing figures. While peristaltic technology has certain desirable characteristics for use in some applications, the present disclosure is not intended to be limited to any specific pumping mechanism integrated with or employed by cartridge 300.

In some embodiments, a single peristaltic pump may be employed to draw liquid from reservoir 380. Where reservoir 380 is rigid and sealed (such as illustrated in FIG. 5A, for example), the reduced volume of liquid and resulting pressure change may lead to undue stress on structural components of cartridge 300 due to pressure differentials. To prevent damage to cartridge 300, pump 393 may periodically run in reverse so as to pump air back into reservoir 380 and to equalize pressure in reservoir 380 with ambient pressure. For example, pump may run in reverse for a predetermined period of time following each cleaning cycle; such a strategy may further reduce or substantially eliminate the possibility of leakage since, while equalizing pressure, liquid downstream of pump 393 may be returned to reservoir 380 during reverse pumping operations.

Additionally or alternatively, an air relief valve may be provided to relieve stresses on reservoir 380 and other structural elements due to pressure differentials. As another alternative, a second peristaltic pump may be employed to pump air into reservoir 380; in such an arrangement, the second pump may employ a second tube on impellor assembly 394 to avoid redundancy.

In an alternative embodiment that is less susceptible to damage resulting from vacuum pressure created in reservoir 380, it may be desirable to implement reservoir 380 as a collapsible bladder or bag, as illustrated in FIG. 4. This bladder may be constructed of rubber, plastic, or any other suitably flexible and leak-proof material. In accordance with this embodiment, reservoir 380 may contract under vacuum as liquid is drawn through feed conduit 395. It will be appreciated that as the bladder of reservoir 380 contracts in the FIG. 4 implementation, the volume of receptacle 312 may increase accordingly.

Returning again to FIGS. 4 and 5A, another portion of cartridge 300, disposed aft of pump mechanism 390 in the drawing figures, may include an absorbent pad 330 that is operative to swab the operating environment or surface to be treated, picking up any cleaning solution deposited on the surface as well as diluted dirt and debris. As an alternative, some embodiments may allow pump 393 to supply water or a cleaning solution directly to pad 330 (rather than to the surface to be treated) prior to, or substantially simultaneously with, application of pad 330 to the surface. In other embodiments, liquid may be applied to a separate pad (i.e., independent of the one illustrated in FIGS. 4 and 5A). Where such an independent pad is disposed forward of pad 330, it may be vibrated or otherwise agitated to scour the surface to be treated; in this instance, pad 330 depicted in the drawing figures may be employed to swab up loosened particulate matter and any residual cleaning solution remaining on the surface. It will be appreciated that the spatial orientation of the components depicted in the drawing figures, as well as the types of components employed for numerous applications, are susceptible of various modifications and alterations, and may be dependent upon a desired functionality or intended use of robot 100 incorporating cartridge 300.

As indicated in the drawing figures, pad 330 may be implemented as a continuous strip. During use, pad 330 material may be fed, for example, from a roll 331; excess or soiled material may be rolled onto a take-up roller 332. As a portion of pad 330 becomes soiled during use, it may be selectively or periodically replaced with material that is drawn (by take-up roller 322) into a position in contact with the surface to be treated. In that regard, exemplary embodiments employ take-up roller 332 actively to draw pad 330 from roll 331; accordingly, take-up roller 332 may interface with, and be driven by, cooperating structures on body 200. Operative engagement of take-up roller 332 with body 200 may be effectuated substantially as described above with specific reference to brush roller 311.

As with brush roller 311, take-up roller 332 generally includes end portions 336 that may be allowed to fit loosely within shell portions 301A and 301B such that apertures 333 are not required to have tight tolerances with respect to a bearing surface 334. Shell portions 301A and 301B may be designed so as not to interfere with proper engagement of end portions 336 with an interface structure on body 200. It may be desirable to ensure that end portions 336 are precisely aligned with apertures 333 while still allowing take-up roller 332 to rotate freely.

In one embodiment, end portions 336 are designed to engage a spring-biased structure on interface 259 associated with motor 250 upon proper insertion of cartridge 300 with body 200; during use, motor 250 may be responsive to instructions from electronics module 220, for example, or from a dedicated processing component, regarding desired operation of take-up roller 332. In the embodiment illustrated in FIG. 3A, interface 259 comprises a gearing mechanism that is driven by a motor 250. Accordingly, end portions 336 may comprise a gear 335 or other structure that is operative to engage a gear on interface 259. In operation, gear 335 transmits torque to end portions 336, causing take-up roller 332 to rotate.

A tensioning spike (reference numeral 338 in FIG. 5A) may prevent feed roll 331 from paying out excess (slack) pad 330 material during operation. Spike 338 may be spring-loaded, for example, or may include another active mechanism operative to release pad 330 when take-up roller 332 is winding, but otherwise to retain necessary or desired tension on pad 330 during operation.

As noted above, a gearing mechanism may be suitable for some applications of interface 259, particularly where torque reduction or rotational velocity control is desired, for example. As with the interface 249 described above, however, interface 259 may employ drive shafts, belt drives, or other simpler mechanical connections. Irrespective of any gearing mechanisms employed internally by interface 259, proper engagement of end portions 336 with interface 259 may be achieved using any of the structural elements set forth above in addition to, or as an alternative to, using a gear 335.

Though the foregoing example addresses a situation in which take-up roller 332 is driven through interface 259 by an independent motor 250, take-up roller 332 may alternatively be driven by drive mechanism 240. In such an alternative arrangement, gearing by interface 249, as well as the mechanism by which interface 249 engages end portions 336, may be similar to those already described. Where take-up roller 332 is driven by drive mechanism 240, it may be desirable to locate take-up roller 332 closer to drive mechanism 240 than feed roll 331, i.e., the locations of take-up roller 332 and feed roll 331 depicted in FIGS. 4 and 5A may be reversed. Moving take-up roller 332 to a position more proximate to drive mechanism 240 may simplify components of interface 249.

Figure 5B:
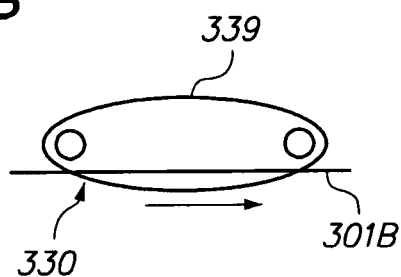
FIG. 5B is a simplified cross-sectional view of an alternative pad arrangement for an application-specific cartridge.

FIG. 5B is a simplified cross-sectional view of an alternative pad arrangement for an application-specific cartridge, though other arrangements are contemplated. In some embodiments, feed roll 331 may be eliminated. It will be appreciated that, in contrast to take-up roller 332, feed roll 331 may or may not be associated any structural roller mechanism; where feed roll 331 is omitted from a particular embodiment, any attendant roller mechanisms will also generally be omitted. For instance, clean pad 330 material may simply be stored in a fan-fold format (i.e., repeatedly folded back over itself instead of in a rolled format; alternatively, the entire pad 330 may be carried by a single roller, such as are typically implemented in painting applications. In the exemplary FIG. 5B embodiment, pad 330 material may be implemented as a continuous belt 339. An assembly including a cleaning apparatus (such as a scraping element, an electrostatic element, a liquid cleaner, or a combination thereof) may be employed to clean belt 339 and pad 330 prior to application to the surface to be treated.

FIGS. 8A-8D are simplified diagrams illustrating exemplary embodiments of pad material for use in conjunction with an application-specific cartridge.

Figure 8A:
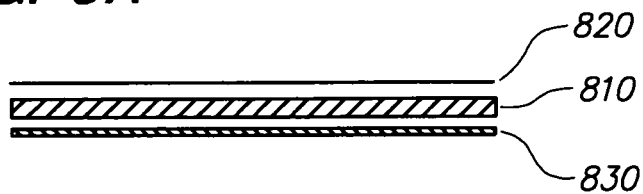
FIGS. 8A-8D are simplified diagrams illustrating exemplary embodiments of pad material for use in conjunction with an application-specific cartridge.
Figure 8B:
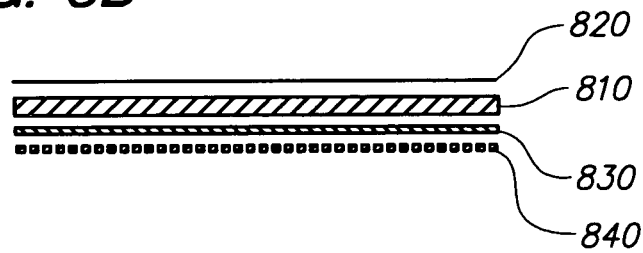

Pad 330 may comprise or incorporate any number of materials. The material may be electrostatic or standard, for example, and may be woven or non-woven. Paper, cellulose, cotton, or other fibrous materials may have utility in some applications. Pad 330 may be constructed of a single sheet of material (such as a quilted paper, for example). In the alternative embodiments illustrated in the drawing figures, pad 330 may be layered to produce desired cleaning effects. In FIG. 8A, for example, pad 330 includes an absorbent layer 810, a plastic or other non-permeable layer 820, and a surface contact layer 830. Layer 830 may be abrasive or electrostatic. In FIG. 8B, a mesh layer 840 may be included. Some mesh materials, such as nylon, cotton, or strongly woven cellulose material, may improve scrubbing or scouring characteristics of pad 330.

Figure 8C:
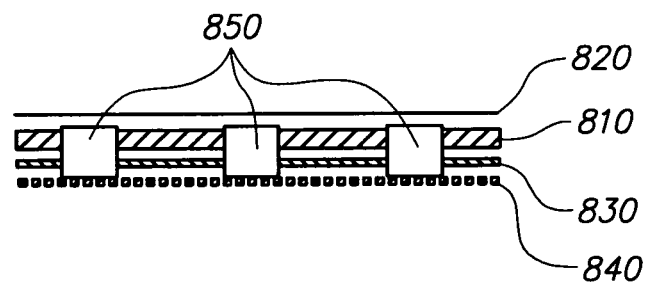

As indicated in FIG. 8C, pad material may be impregnated with a liquid such as water, a cleaning solution, a liquid floor wax, or other desired liquid that may be selected in accordance with the material utilized for pad 330, with chemical treatments applied to that material, or both. Pockets 850 containing liquid may be pierced, for example, as the pad material is unwound or otherwise deployed from cartridge 300; alternatively, pockets 850 may be pierced as a result of abrasion against the surface being treated. In the forgoing manner, sufficient liquid to enable cleaning operations may be carried by the material of pad 330 itself, minimizing or eliminating the necessity to integrate reservoir 380 into cartridge 300 for that purpose—reservoir 380 may nevertheless carry liquid for other purposes, for example, to provide a wet brush function, to minimize dust kicked up from robot 100, and so forth.

Figure 8D:
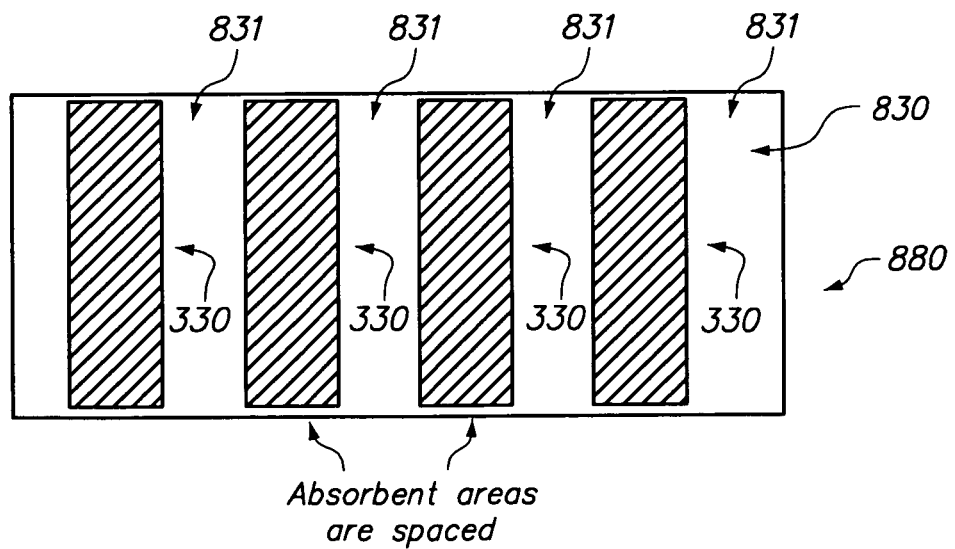

As illustrated in FIG. 8D, a pad strip 880 may include multiple areas characterized by a pad 330 (which may possibly include an absorbent layer 810 as described above), separated by interstitial spaces 831 that do not include an absorbent layer 810. As indicated in FIG. 8D, pad strip 880 may include a substantially continuous surface contact layer 830. This arrangement may prevent or minimize wicking, which, in some wet applications, may cause portions of pad material to get wet prematurely, for example, or otherwise more thoroughly than desired.

It will be appreciated that various materials and chemical treatments may be implemented or used in conjunction with pad 330 as generally known in the art. For example, surface contact layer 830 may be impregnated with water absorbing chemicals and the like to enhance absorption without increasing thickness. The present disclosure is not intended to be limited to any particular type of material or combination of materials implemented as pad 330.

Figure 9:
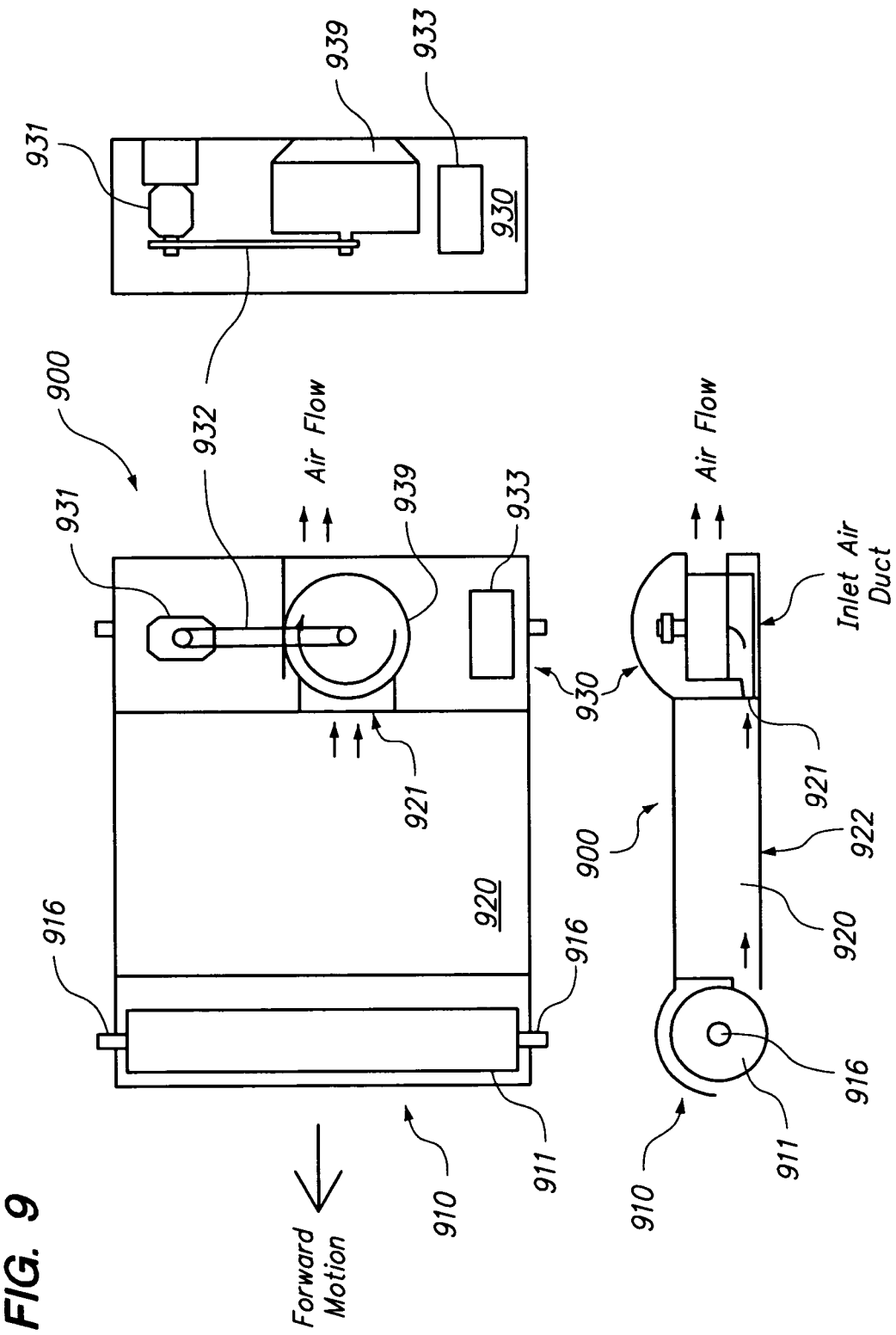
FIG. 9 is simplified diagram illustrating several views of another exemplary embodiment of an application-specific cartridge.

FIG. 9 is simplified diagram illustrating several views of another exemplary embodiment of an application-specific cartridge. In one embodiment, cartridge 900 may be implemented to perform a vacuuming function, for example, on hard floors or piled flooring materials such as rugs and carpets.

Where cartridge 900 is configured to be powered by body 200, a vacuum beater bar roller brush 911 may be configured and operative to engage an interface 259 associated with motor 250 upon proper engagement of cartridge 900 with body 200 in a manner similar to that described above with reference to take-up roller 332 and brush roller 311; during use, motor 250 may be responsive to instructions from electronics module 220, for example, or from a dedicated processing component, regarding desired operation of brush 911. Alternatively, brush 911 may be driven by drive mechanism 240 substantially as described above. Similarly, a vacuum pump disposed in cartridge 900 may be driven by a motor 250 associated with body 200, such as that described above operative to drive take-up roller 332. In such an embodiment, it may be desirable to include a gearing mechanism, either in cartridge 900 or in interface 259, to step up the rotational speed, and to step down the torque, delivered to the vacuum pump.

In some implementations, cartridge 900 is self-powered to an extent, i.e., it may include an integral motor for driving beater bar roller brush 911, a vacuum pump 939, or both. Necessary electrical connections to power such a motor, for example, or to allow electronics module 220 to ascertain the type and capabilities of cartridge 900, may be made automatically upon engagement of cartridge 900 with body 200. In an entirely self-powered embodiment, cartridge 900 may include a dedicated battery or smart battery pack. Electrical connections allowing such a battery to recharge (e.g., drawing current from an external power supply coupled to body 200) may be made automatically upon engagement of cartridge 900 with body 200.

As illustrated in FIG. 9, one exemplary vacuum cartridge 900 generally combines some of the various features described above. As illustrated, vacuum cartridge 900 comprises a beater bar assembly 910, a suction chamber 920, and a pump assembly 930. Beater bar assembly 910 comprises a brush 911 having end portions 916 adapted to be driven by drive mechanism 240 and interface 249, or by a dedicated motor 250 and interface 259, associated with body 200. Mechanical interconnections may be effectuated substantially in the manner set forth above.

During use, beater bar assembly 910 dislodges dirt to be collected by suction chamber 920. Chamber 920 may generally be characterized by a rigid housing incorporating filters 921 (such as a HEPA (high-efficiency particulate air) filter, an electrostatic filter, and the like), a semi-permeable bag or bladder for collecting particulate matter, or a combination thereof, as is generally known in the art. In any event, it may be desirable to include a structure to seal chamber 920 (such as with a spring-biased plate or hinged door) substantially as described above with reference to receptacle 312 in the discussion of FIGS. 4 and 5A. Chamber 920 may include a selectively closable hatch or door 922, enabling access to chamber 920 for the purpose of discarding collected material, cleaning or replacing filters 921, or replacing a vacuum bag nearing the end of its useful life.

In the exemplary embodiment, vacuum cartridge 900 employs a motor 931 and a belt drive mechanism 932 in pump assembly 930. In combination, these components drive a pump 939 as indicated. In some applications, pump 939 may be a squirrel cage blower, though other pumping technologies suitable for vacuum applications may also be appropriate. Operating power for motor 931 may be supplied by a dedicated battery or smart battery pack 933. Electrical connections enabling battery pack 933 to recharge (e.g., drawing current from an external power supply coupled to body 200) may be made automatically upon engagement of cartridge 900 with body 200. Alternatively, battery pack 933 may be omitted, in which case, necessary electrical connections required to provide operating power to motor 931 may be made automatically when vacuum cartridge 900 and body 200 are operably coupled.

Pump assembly 930 may also include electronics (not shown) to control or otherwise to influence operation of motor 931. For example, where a vacuum bag is full or chamber 920 is not otherwise allowing free flow of air, such electronics may be implemented to slow motor 931 or to trigger a clutching mechanism, disengaging the belt drive, to prevent damage to motor 931. Such electronics may also be implemented to provide data to electronics module 220 regarding the operational characteristics of vacuum cartridge 900 as set forth below.

The foregoing are some exemplary embodiments of functional cartridges 300 and 900 that may be useful for allowing robot 100 to perform multiple tasks without substantial reconfiguration of hardware and software components. It will be appreciated that various modifications and alternations may extend the capabilities of robot 100. For example, by incorporating dehumidifier technology into body 200 or into a specialized functional cartridge, for example, water may be condensed from moisture in the air for use as a cleaning solution. Alternatively, liquid containers (e.g., for clean liquid and for used liquid) may be incorporated into a specialized functional cartridge; these containers may be disposable or refillable. In some embodiments, liquid may be stored in an open container such as a cistern, for example, or other open-topped reservoir that may be filled (such as by rain water, run-off from a down spout on a structure, output from a hose or shower head, etc.) by an external source.

As another example, a functional cartridge may be configured to use washable (i.e., selectively removable) filters such as mechanical filters employing fabrics or other physical matrices, chemical filters employing carbon or other filter media, and the like; recirculated cleaning solution may be utilized in conjunction with such a filter or with a sediment tank. As an alternative, an evaporating cleaning solution may be used such that disposal of contaminated cleaning solution is not required; periodic replenishing of the cleaning solution and cleaning or replacing the filter is all that may be required of an operator.

As noted above, in accordance with one aspect of the present invention, a number of different types of specialized functional cartridges (such as those described above) may be employed to provide broad functionality and flexibility to robot 100 and body 200. Those of skill in the art will appreciate that electronics module 220 may be readily programmed to identify different cartridge types upon engagement of a functional cartridge with body 200. Electrical contacts in body 200 may be designed and operative to read a unique identifying pattern of conductive foil, for example, disposed on a cartridge; similarly, a unique pattern of magnets integrated into the structure of a functional cartridge may be employed to identify the type of cartridge. A series of punched holes or dimples, for example, or other structural elements may also be used. In some embodiments, a two- or three-dimensional bar code disposed on a cartridge may be read, for example, by an optical sensor (described below) prior to coupling the cartridge with body 200, or by a dedicated sensor in body 200 that is aligned to read the code when the cartridge is operably coupled with body 200. In some more sophisticated embodiments, a functional cartridge may include power and electrical connections to couple with cooperating contacts on body, and may include read only memory (ROM) or other suitable volatile or non-volatile data storage that may provide desired information regarding the capabilities of the cartridge to electronics module 220.

In the foregoing manner, a functional cartridge may be so constructed to provide desired or necessary information to electronics module 200 sufficient to program or otherwise to instruct body 200 to operate in conjunction with the cartridge, effectively establishing the functionality of robot 100 in accordance with the operating characteristics of the cartridge. Alternatively, panel 270 may be employed to provide input to electronics module 220 regarding the nature and capabilities of a cartridge.

Upon identification of a particular type of functionality to be enabled by a cartridge, electronics module 220 may configure or initialize certain settings as may be required or desired to use the cartridge. For example, electronics module 220 may identify appropriate speed and cycle time settings for motors 250, selectively enable or disable pump drive mechanism 290 as appropriate, set operational time parameters, select from one of a plurality of pre-programmed cleaning cycle sequences, and so forth. In the foregoing manner, robot 100 may be selectively configurable to perform a specific task in accordance with the functionality of a removable cartridge that is selectively coupled to body 200.

Navigation & Obstacle Avoidance

In some instances, it may be desirable to enable an operator to direct robot 100 to a particular place within an operating environment. Whether operating under direction of an operator or acting autonomously, robot 100 generally must navigate independently. As set forth below, optical assembly 260 may enable robot 100 to determine where it is relative to other objects or boundaries within an operating environment. One important aspect of spatial orientation in this context is the ability reliably to ascertain distances to objects.

Figure 10:
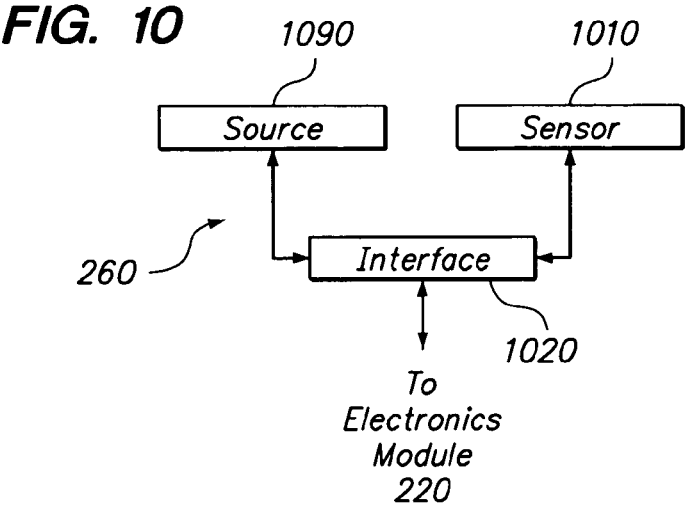
FIG. 10 is a simplified block diagram illustrating components of an exemplary embodiment of an optical assembly comprising an optical sensor.
Figure 11:
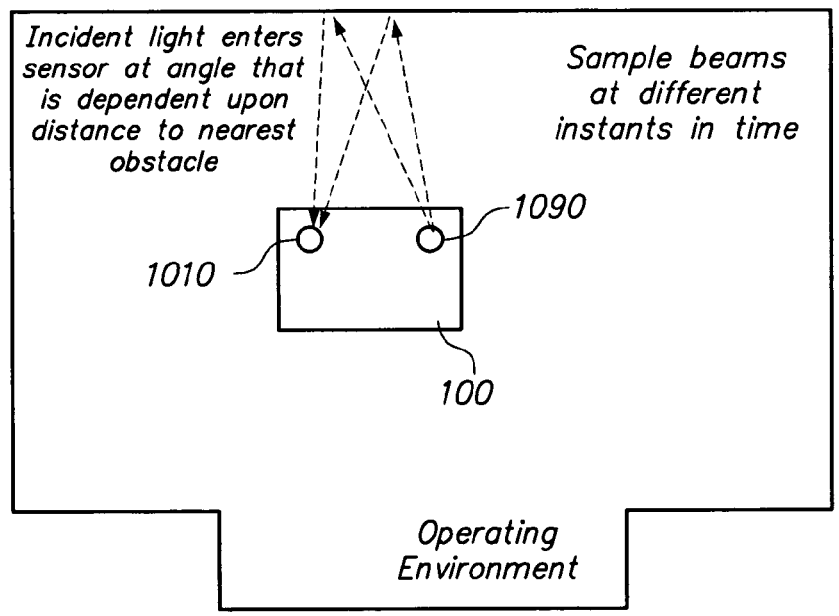
FIG. 11 is a simplified top view of a robot in an operating environment.
Figure 16A:
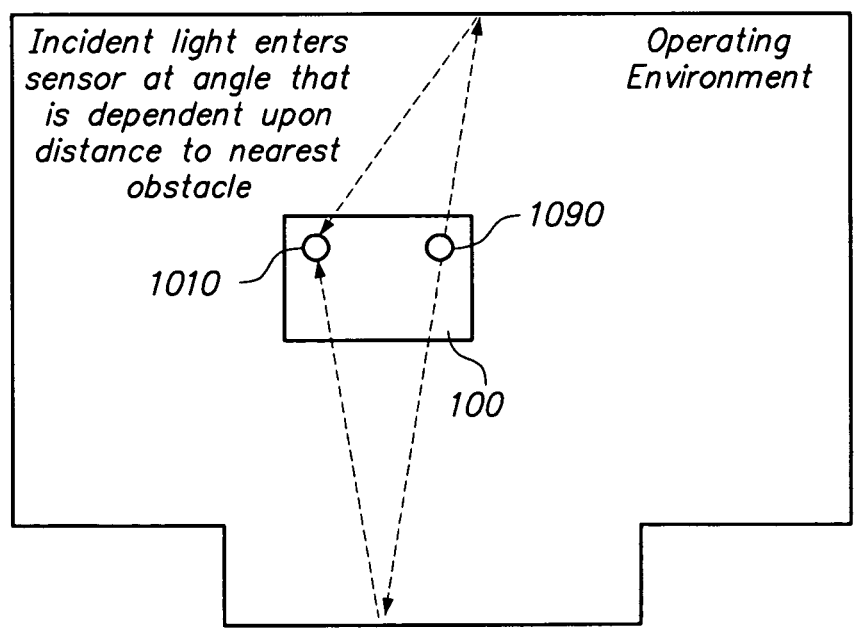
FIG. 16A is another simplified top view of a robot in an operating environment.
Figure 16B:
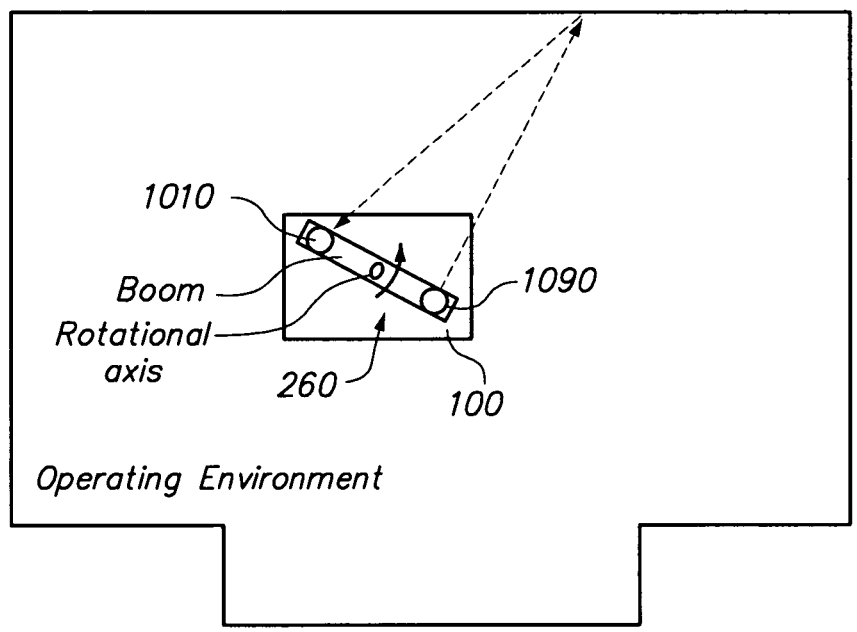
FIG. 16B is another simplified top view of a robot, characterized by one embodiment of an alternative optical assembly, in an operating environment.

FIG. 10 is a simplified block diagram illustrating components of an exemplary embodiment of an optical assembly comprising an optical sensor. FIGS. 11, 16A, and 16B are simplified top views of a robot in an operating environment; in FIG. 16B, robot 100 is characterized by one embodiment of an alternative optical assembly.

As indicated in FIG. 10, optical assembly 260 generally comprises an optical sensor 1010, a light source 1090, and an interface 1020 enabling bidirectional data communication with electronics module 220. In some embodiments, interface 1020 may optionally include additional electronics necessary to operate the components of optical assembly 260 or to facilitate control of those components by electronics module 220. While optical assembly 260 is illustrated as integral with body 200 in FIGS. 3A and 11, for example, it will be appreciated that an external system may also be employed; in this case, a physical connection (such as USB or FIREWIRE) or a wireless connection (such as BLUETOOTH or 811.02) may transmit necessary or desired data between components of optical assembly 260 and electronics module 220.

As noted briefly above, sensor 1010 may include or be embodied in a CCD, a linear CCD, a CMOS, a position sensitive detector (PSD), or other sensor apparatus that is sensitive in the same frequency bands of the electromagnetic spectrum as output from source 1090. Some of this technology, or variations thereof, is gaining popularity in digital cameras and in other consumer electronics applications, and various types of digital camera sensing technology may be integrated into optical assembly 260. One example of a device suitable for use as sensor 1010 is a CMOS sensor (such as, e.g., a model number P03130R0 currently marketed by Pixelplus Corporation), though other types of sensor technology may be employed as noted above.

Source 1090 may comprise or be embodied in a laser, an LED, or any other source that produces electromagnetic energy within the band of the spectrum that is detectable by sensor 1010. Some applications may benefit from utilization of combinations of these technologies. The output of source 1090 may be visible or invisible to the human eye. One example of a suitable source 1090 is a short wavelength laser diode (such as, e.g., a model number SLD-650-P5-300-05 currently marketed by Union Optronics Corporation), though other types of output for source 1090 may be employed.

It may be desirable to utilize source 1090 that is capable of producing variable output in differing frequency bands, as color and reflectivity of illuminated objects may affect distance measurements using some methodologies by influencing the quality and characteristics of light received by sensor 1010. Shifting output of source 1090 to a different frequency may produce more accurate results in some cases. Additionally or alternatively, a filter operative to attenuate certain frequencies while transmitting others may be utilized to produce similar effects. It will also be appreciated that source 1090 may employ more than one independent source of output; for example, as set forth in more detail below, source 1090 may incorporate both a laser and an LED operating either simultaneously or intermittently. Such an implementation of source 1090 employing two or more independent light sources may have particular utility in some circumstances.

Further, source 1090 may include an optics package (reference numeral 1099 in FIG. 3A), such as are generally known in the art for collimating or otherwise affecting the properties of emitted light. Such an optics package may employ one or more fixed focus lenses, active focus control apparatus, light collimators, beam splitters, apertures, mirrors, selective band pass filters, or various combinations of these and other components. As set forth in more detail below, sensor 1010 may comprise or be implemented in combination with various configurations of an optics package 1019 as well.

In some embodiments, output from source 1090 may be caused to rotate. In that regard, a dedicated motor (reference numeral 1091 in FIG. 3A) in body 200 may be employed to provide desired rotation of source 1090 itself or of selected elements of an optics package; this arrangement may eliminate complicated gearing mechanisms that may be required if components of source 1090 were rotated by a shared motor, though such embodiments are possible and may be more cost effective in some situations. Source 1090 may be rotated as a whole, for example, or a particular element of optics package 1099 (such as a mirror or a beam splitter) may be rotated. Those of skill in the art will appreciate that creating a rotating beam from conventional light sources and other optics components may be accomplished without inventive faculty.

As illustrated in FIG. 3A, source 1090 and sensor 1010, or their respective optics assemblies, may be so disposed as to have a full 360 degree view of the operating environment. Accordingly, a beam from source 1090 may be continually or intermittently rotated in a 360 degree pattern about an axis normal to the surface upon which robot 100 is placed; alternatively, a beam may be swept back and forth across an arc of less than 360 degrees. Additionally or alternatively, output from source 1090 may be actively aimed in a particular direction momentarily. Each of the foregoing options may be useful for acquiring data that facilitate distance measurements.

During use, as illustrated in FIG. 11, projected light from source 1090 may reflect off objects in the operating environment, and may be received by sensor 1010 at a measurable angle. Where the relative position and spatial orientation of source 1090 and sensor 1010 are known and recorded or otherwise stored in interface 1020 or electronics module 220, optical assembly 260 may facilitate accurate positioning of robot 100 by allowing precise distance computations. In that regard, positional and navigational processing may be executed by electronics module 220 taking into consideration both the known geometry of sensor 1010 relative to source 1090 as well as the nature and timing of signals received by sensor 1010. For example, distance may be determined through trigonometry using a combination of factors such as the known distance between sensor 1010 and source 1090, the angle of reflected light detected by sensor 1010, the speed of robot 100, the time delay between production of the beam by source 1090 and its subsequent reception at sensor 1010, discrepancies between sequential measurements, and so forth. As indicated in FIG. 11, the angle at which light enters sensor 1010 generally varies over time as a function of robot 100 movement and due to rotation of the beam produced by source 1090.

The angle of light incident on a sensing surface 1011 of sensor 1010 may be determined in various ways. For example, the angle may be determined by identifying the brightest pixel in the array on the sensing surface 1011. Alternatively, the brightest contiguous series of pixels may be utilized, such as, for example, by identifying a center or central region of the contiguous series and considering that the point of a brightest pixel. Various image processing techniques such as sub-pixel processing, interpolation, normalization, and the like, may be employed to locate a bright region on a sensing surface 1011 of sensor 1010 and to employ that region to ascertain the angle of incident light.

Figure 12:
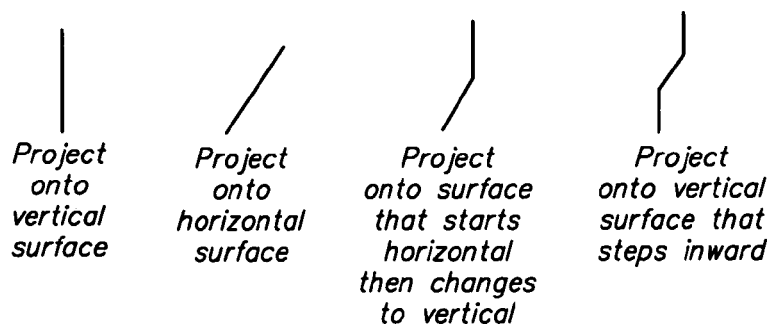
FIG. 12 is a simplified diagram illustrating different input received by an optical sensor.

In some embodiments, output from source 1090 may be projected as a plane such that, when incident on a substantially vertical surface (such as a wall), the light may be detected as a substantially vertical line on that surface. Distance to different parts of the projected line may be determined by measuring the angle of light detected by sensor 1010. For example, where output from source 1090 is projected onto a surface that is vertical with respect to optical assembly 260, sensor 1010 may detect a straight vertical line. Where output from source 1090 is projected onto a surface that is not vertical, sensor 1010 may detect a line that is angled from vertical. FIG. 12 is a simplified diagram illustrating different input received by an optical sensor. Various configurations of lines that may be detected by sensor 1010 are illustrated in FIG. 12.

Given the exemplary arrangement of components of optical assembly 260, various methodologies may be employed to detect distance to objects. So called "time-of-flight" and triangulation computations, for example, are discussed briefly above, and generally have utility in calculations based upon relative positions of components, angular orientation, speed, and multiple measurements. Another method may employ measuring an amplitude of reflected electromagnetic energy that is incident on sensor 1010. In that regard, where output from source 1090 is lased or other highly collimated light, the material, color, and reflectivity characteristics of an illuminated object may affect the amplitude of light detected by sensor 1010 that is reflected off of that object; accordingly, distance measurements acquired in this manner may be extremely accurate, or may suffer from significant inaccuracies due to limitations of this sensing methodology, depending upon the composition of the object that is illuminated.

One strategy for counteracting this shortcoming includes illuminating an object with independent sources of light of differing types, such as a laser (or other source of collimated light) and an LED (or other source of diffuse light). Measurements of reflected light of the diffuse variety may allow computations in electronics module 220 and interface 1020, either operating independently or in combination, to account for amplitude fluctuations detected in the returned collimated light, such as may be caused by color, reflectivity, or other characteristics of the illuminated object. In the foregoing manner, use of a diffuse light source in combination with a collimated light source may facilitate, for example, error correction, normalization, or other calculations having utility in assessing the amplitude (and amplitude variations) of detected collimated light. Accordingly, some embodiments of source 1090 may employ two or more independent sources of electromagnetic energy of differing varieties, as set forth above. In these circumstances, optics package 1019 (described below) may be constructed to employ dedicated portions of a surface of sensor 1010 for each type of light to be detected.

Accuracy of distance measurements computed as set forth above may be influenced by the regularity and the frequency with which they are obtained. Accordingly, in one embodiment, source 1090 remains operative permanently to produce a continuous beam; sensor 1010 may take instantaneous readings of received light at periodic intervals; in some instances, the shorter the interval between successive measurements, the more accurate the measurements may be. As an alternative, where sufficient processing power is available, sensor 1010 may operate continuously to monitor changing signals in real time as robot 100 dynamically changes its orientation.

As noted above, sensor 1010 may be employed in conjunction with optics package 1019. In some situations, it may be desirable that optics package 1019 includes a narrowband optical filter that operates at substantially the same frequency as the output from source 1090; in such embodiments, the brightest light detectable by sensor 1010 will generally be the light projected by source 1090. It will be appreciated that such a filter strategy may not be desirable for certain applications.

Figure 13:
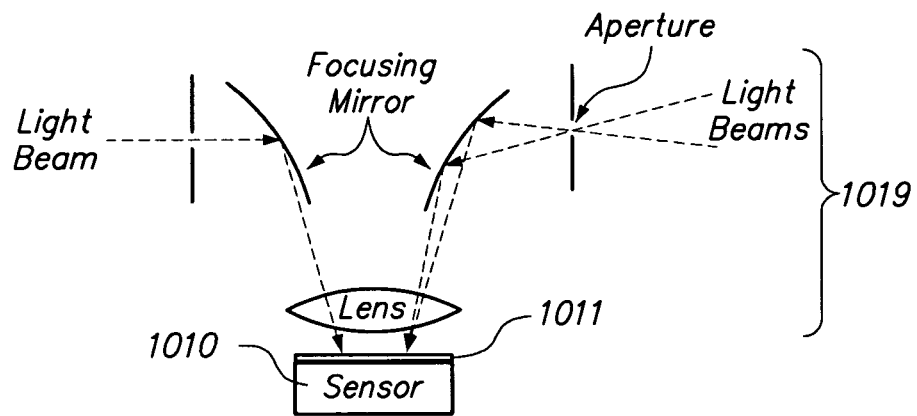
FIG. 13 is a simplified cross-sectional diagram of a sensor operating in conjunction with an exemplary embodiment of an optics package.
Figure 14:
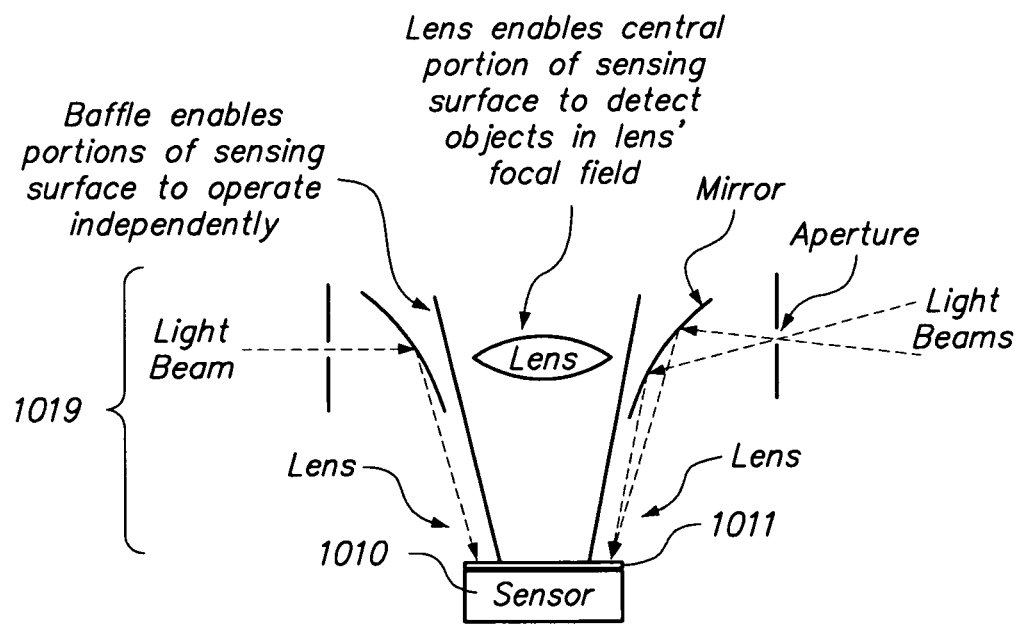
FIG. 14 is a simplified cross-sectional diagram of a sensor operating in conjunction with another embodiment of an optics package.
Figure 15:
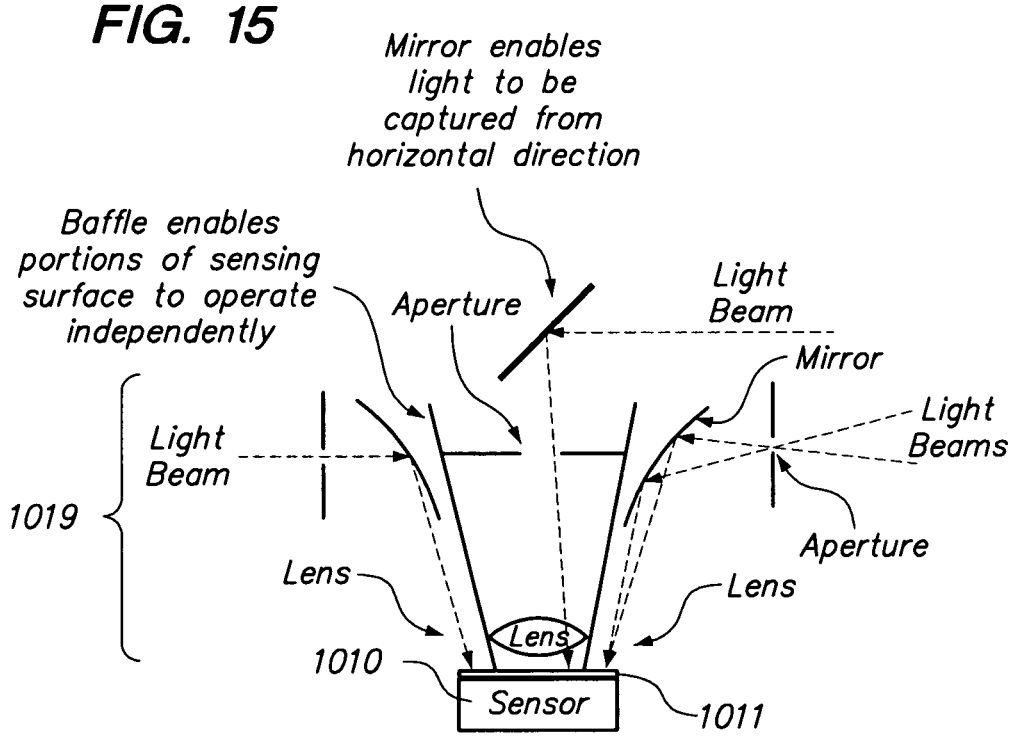
FIG. 15 is a simplified cross-sectional diagram of a sensor operating in conjunction with another embodiment of an optics package.

FIGS. 13, 14, and 15 are simplified cross-sectional diagrams of a sensor operating in conjunction with various embodiments of an optics package.

In some embodiments, optics package 1019 may employ a 360 degree lens or a hemispherical mirror, for example, enabling sensor 1010 to receive data from all directions simultaneously. Alternatively, a mirror need not be hemispherical. For example, a mirror having a parabolic or other cross-section may be so constructed as to allow light rays that are not arriving from the horizontal to project onto the same spot on the sensing surface 1011 of sensor 1010 as is illustrated in FIG. 13; as indicated in the drawing figure, a lens or lens array may facilitate overall functionality of sensor 1010. This technique may simplify image processing while maximizing detected light and improving performance of sensor 1010. It will be appreciated that the focusing mirror and aperture illustrated in FIG. 13 may be revolved about an axis normal to sensing surface 1011 or constructed in a full 360 degree arc, allowing light to be captured simultaneously from all directions radial to that axis. Accordingly, the FIG. 13 arrangement only employs a narrow ring of pixels on sensing surface 1011 for distance measuring applications. Remaining real estate on sensing surface 1011 may then be implemented as a standard camera, for example, as illustrated in FIG. 14; additionally lenses may be implemented where indicated to enable or to improve distance measuring functionality.

Alternatively, as indicated in FIG. 15, a mirror may be used in lieu of the lens illustrated in FIG. 14. Where optics package 1019 employs a mirror in the manner depicted in FIG. 15, image data may be acquired from the side, rather than from above as in the FIG. 14 arrangement; as shown, lenses may be included as desired or appropriate. Optics assemblies 1019 comprising various combinations of mirrors, lenses, prisms, filters, light collimators, and other components may be devised to allow a central portion of sensing surface 1011 to receive light from any direction.

With respect to sensor 1010 in general, those of skill in the art will recognize that some sensing technology optimized for detection of energy in certain bands of the electromagnetic spectrum may benefit from a relatively narrow focal field and a high degree of magnification, or "zoom." Accordingly, sensor 1010 and optics package 1019 may be suitably constructed with components to provide a narrow focal field as well as a high optical or digital zoom. One such embodiment is described below with particular reference to FIGS. 16C and 16D.

It will be appreciated that an optics package employed in conjunction with source 1090 may utilize one or more beam splitters or prisms such that multiple beams may be output and rotated simultaneously. In some embodiments, optics package 1019 may be configured and operative to receive multiple images from multiple directions simultaneously or in rapid succession. By way of example, a single CCD or CMOS sensor 1010 may be utilized in conjunction with optics package 1019 comprising a mirrored pyramid (or other arrangement), allowing simultaneous detection from four directions; such an embodiment may be used in conjunction with a source 1090 comprising four lasers or other independent light sources, for example, or with a single light source output through appropriate beam splitters disposed in optics package 1099. FIG. 16A shows two beams emanating from source 1090 simultaneously and at a relative angle of approximately 180 degrees. Given the foregoing, it will be appreciated that any number and angular orientation of beams may be utilized, though practical applications may generally be limited by processing resources at electronics module 220 and interface 1020, as well as by the capabilities of sensor 1010.

Figure 17:
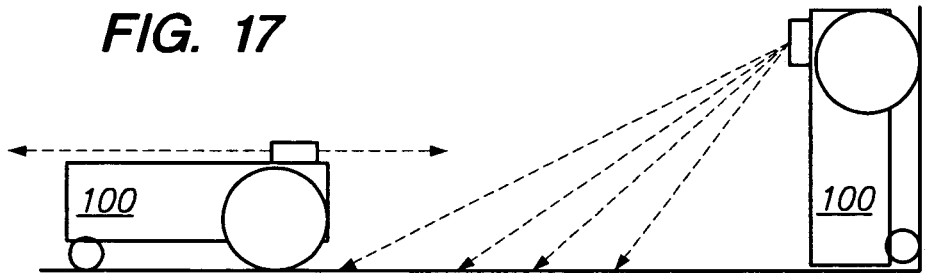
FIG. 17 is a simplified side view of a robot in a first position in an operating environment and in a second position engaged with a base.

FIG. 17 is a simplified side view of a robot in a first position in an operating environment and in a second position engaged with a base. As set forth above, sensor 1010 and optics package 1019 may be configured such that when robot 100 is functioning in an operating environment, such as indicated on the left side of FIG. 17, sensor 1010 may effectively view 360 degrees about an axis normal to the surface to be treated. When robot 100 is in a different orientation while docked at a base, for example, as indicated on the right side of FIG. 17, sensor 1010 may be employed to view the operating environment from an advantageous perspective, e.g., by utilizing the central portion of sensing surface 1011 substantially as described above with reference to FIGS. 14 and 15.

When robot 100 is in the orientation depicted in at the right side of FIG. 17, sensor 1010 may be employed, for example, to detect the location and movement of a light projected onto a specific location in the operating environment. Accordingly, an operator may provide input or issue commands to robot 100 using a source of lased light (a laser pointer), for example, or some other source operating at an appropriate frequency to be detected by sensor 1010.

For example, a laser pointer may be used to identify a particular point in an operating environment. Robot 100 may be instructed to act with respect to that location information in a number of different ways: move to that location to perform a cleaning function; avoid that location; store that location as a reference point (for example as a vertex of a polygon describing a special area) or boundary marker; and so forth. In that regard, a remote control unit may be employed to signal operator interface panel 270 to provide instructions regarding how electronics module 220 is to treat the location identified by the laser pointer as detected by sensor 1010.

Those of skill in the art will appreciate that the implementation and structural arrangement of components of source 1090, sensor 1010, and optics packages 1019, 1099 are susceptible of numerous variations. For example, one or more cameras with conventional lenses may be utilized; if 180 degree "fisheye" lenses are utilized in optics package 1019, two sensors may cover a 360 degree region. Rather than employing an optics package to rotate a beam from source 1090, a fixed light source may be employed on a rotating platform external to body 200 of robot; sensor 1010 may or may not also be mounted on such a rotating platform. In particular, FIG. 16B is another simplified top view of a robot, characterized by one embodiment of an alternative optical assembly, in an operating environment.

As illustrated in FIG. 16B, optical assembly 260 may comprise a rotating platform or boom upon which sensor 1010 and source are mounted. In operation, source 1090 may be fixed with respect to a longitudinal axis of the boom, for example, such that rotation of output may be effectuated by rotation of the boom about an axis of rotation. This arrangement may simplify source 1090 and any attendant optics package 1099 such that the need for internal spinning mirrors or other rotating assemblies is minimized or eliminated. As depicted in FIG. 16B, it may be desirable for source 1090 and sensor 1010 to be disposed on opposite sides of the axis of rotation of the boom.

Figure 16C:
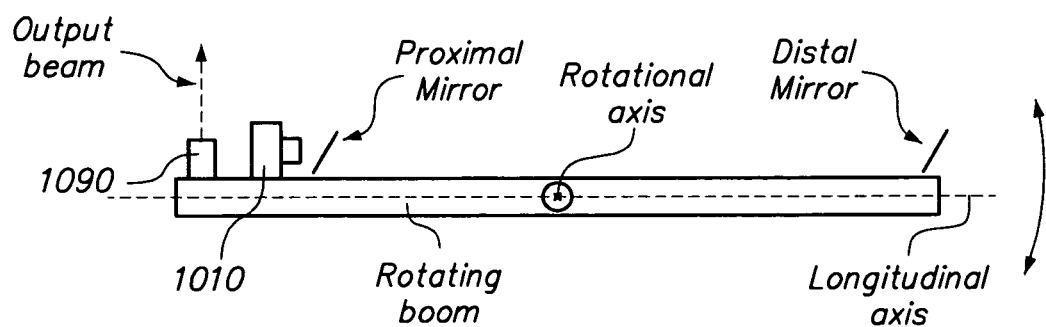
FIGS. 16C and 16D are simplified diagrams illustrating a top view of another alternative embodiment of an optical assembly.
Figure 16D:
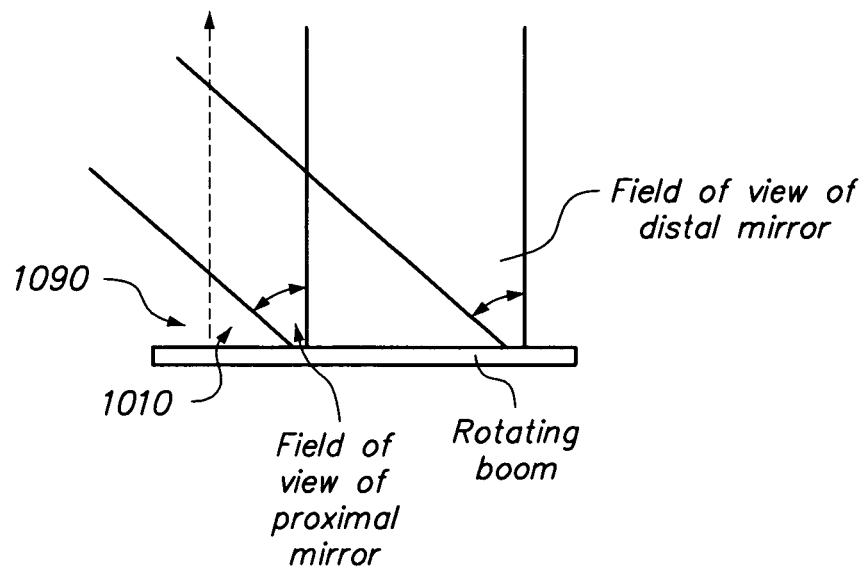

FIGS. 16C and 16D are simplified diagrams illustrating a top view of another alternative embodiment of an optical assembly. As illustrated, both source 1090 and sensor 1010 may be situated on the same side of the boom's axis of rotation. A proximal mirror, used to detect near objects, for example, may be positioned relatively close to sensor 1010; conversely, a distal mirror, used to detect distant objects, for example, may be positioned relatively far from sensor 1010. In the illustrated embodiment, the proximal mirror and the distal mirror may be positioned at different heights (e.g., along the rotational axis illustrated in FIG. 16C) to allow a respective portion of sensing surface 1011 to detect light from each respective mirror.

It will be appreciated that the differing views for the proximal and distal mirrors may be used to facilitate both long and short distance detection modalities; light from the mirror having the more appropriate view for a particular object may be utilized for distance computations. For example, a position of a laser dot as viewed through the proximal mirror may be used to determine distance to nearby objects, whereas a position of a laser dot as viewed through the distal mirror may be used to determine distance to far-away objects. Accuracy of detection at far distances may be greater through the distal mirror than through the proximal mirror due to the view associated with each respective mirror, collimating characteristics of the mirrors, and other factors. Additionally or alternatively, when both mirrors detect an object (such as an object in a location where the mirrors' fields of view overlap), measurements from both mirrors may be employed to compute an average, for example, or to cross-check one measurement against another.

A combination or hybrid of the optical assemblies illustrated in FIGS. 16A, 16C, and 16D may have desirable distance measuring characteristics. In one such hybrid embodiment, source 1090 may be implemented to output two beams (one to complement that illustrated in FIGS. 16C and 16D) at a desired angular orientation, e.g., a complementary beam may be oriented 180 degrees relative to the illustrated beam (as depicted in FIG. 16A). The arrangement of FIGS. 16C and 16D may be suitably modified to include an additional proximal mirror and an additional distal mirror; these additional mirrors may be positioned to detect the complementary beam. Simultaneous distance measurements may be acquired from various locations in the operating environment, though, as noted above, practical applications may be limited by processor bandwidth at electronics module 220, available real estate on sensing surface 1011, power output by source 1090, and other factors.

As another example, electronics module 220 may be configured to be responsive to gestures an operator makes with a laser pointer that are observed by sensor 1010. A circular motion may indicate an area that should be cleaned; a clockwise motion may request one mode of cleaning while a counterclockwise motion may request another. Gestures generally providing indications in a particular direction may be interpreted by electronics module 220 as instructions to move robot 100 in that direction. Also, different colors (or frequencies) of laser light may indicate alternate actions to be performed.

Additionally or alternatively, electronics module 220 may be "trained" or otherwise programmed or instructed regarding aspects of a particular operating environment. For example, one or more strips, lengths, or swatches of material having selected reflective properties may be placed within an operating environment for the purpose of so training electronics module 220; this material may be removed following the training operation and discarded, for example, or stored for subsequent retraining of electronics module 220. In some embodiments, this material may be a roll of adhesive material, for example, such that patterns or borders of selected length may be described in the operating environment. Though the terms "strip" or "swatch" may be employed hereafter, the material may be of any shape or size, providing that the material selected offers a sufficiently unique sensory input to components of body 200 to allow recognition or identification of the strip as such by electronics module 220.

During a training operation, robot 100 may navigate the operating environment, using sensor array 230, optical assembly 260, or a combination of both, to identify the location and extent of strips of this reflective material. Operator input may be received via panel 270, for example, or via a remote control unit to instruct electronics module 220 regarding the meaning or purpose of the regions of the operating environment delineated by the strips. For example, the location and extent of permanent obstructions (such as stair cases) may be delineated or otherwise identified. Additionally or alternatively, strips of material may be employed to erect a virtual, or "phantom", wall that robot 100 is instructed to treat as a physical barrier. Electronics module 220 may store locations or other positional information related to such obstructions (relative to the location of a base or other beacon as described below) and be trained never to visit those locations unless and until instructed otherwise.

Similarly, such strips of material may be employed to segregate or to partition areas within an operating environment into zones (such as by employing phantom walls, for instance); each zone may be treated differently with respect to robotic operations. For example, cleaning operations may be conducted more frequently in certain zones than others, while some zones may be ignored entirely. Wet cleaning operations may be prohibited in some zones (e.g., over hard wood or delicate flooring material), while mandated in other zones (e.g., on a tiled kitchen floor). Providing electronics module 220 with a readily identifiable sensory input, such as through swatches of adhesive or other material having known reflectivity or other characteristics, may allow detailed programming and control of robot 100 (through electronics module 220) for customizable autonomous operations. It will be appreciated that the degree to which such customization is feasible may be affected by the processing capabilities of electronics module 220, as well as by the capacity of any memory or data storage associated therewith or accessible thereby.

Embodiments of robot 100 implementing sensor array 230 and optical assembly 260 such as set forth above may be particularly efficient at thoroughly and systematically covering an entire operating environment.

In that regard, robot 100 may be guided or influenced by electronics module 220 based, at least in part, upon data related to distance measurements acquired by optical assembly 260. Various versions of simultaneous localization and mapping (SLAM) techniques may have utility in such applications.

In accordance with typical SLAM methodologies, localization is based upon creation of a multiplicity of data points, or "particles", that together form a representation of the operating environment. Each discrete particle is a node in a data structure and includes data related to an estimation of the current position of robot 100, as well as data related to an estimation of its direction or orientation (i.e., so-called "inclination"). Additionally, sufficient data are maintained to enable each respective particle to create its own respective version of a map of the entire operating environment (i.e., a "global" map). Representation of such maps may either be line segments, for instance, or a grid delineating boundaries or otherwise describing features of the operating environment.

As robot 100 traverses the operating environment, distance sensor readings (e.g., acquired by optical assembly 260) may be used to update the map of the space associated with each discrete particle, as well as to increment or decrement a particle weight, relevance score, or some other factor representing an estimated accuracy. If a particular distance measurement acquired in real time fits well with what a particle would expect that measurement to be (e.g., based upon the particle's data relating to its version of a global map), that particle's weight may be increased. On the other hand, where a particular distance measurement fits poorly with what a particle would expect the measurement to be, that particle's weight may be decreased. In general, if an individual particle's weight or relevance score falls below a predetermined threshold, that particle may be discarded or otherwise ignored in subsequent processing, whereas a particle having a weight or relevance score that is sufficiently high (e.g., above a different predetermined threshold) may be cloned, creating two or more identical particles.

With respect to traversing the operating environment, wheel motion for robot 100 may be measured with an odometer or other instrument. The position of each respective particle may then be updated based upon an estimation of how each particle would be expected to move, given the known rotation of wheels 242,244. A small amount of random error is introduced into the movement updates of the particles; such random error causes identical (i.e., cloned) particles to drift away from each other as the number of updates mount.

Further, it is expected that robot 100 will not precisely follow the path that the odometer readings suggest; for example, mechanical backlash, debris causing yaw of robot 100, and myriad other factors, may cause the course of robot 100 to deviate in a manner that cannot be predicted using simple odometer readings. The addition of random error to particle position updates tends to result in a universe of particles that respectively follow each possible actual path of robot 100. Accordingly, particle weights (or other relevance scoring system) may generally provide a mechanism to sift through these possibilities, to identify promising possibilities, and to reinforce the best ones.

Figure 16E:
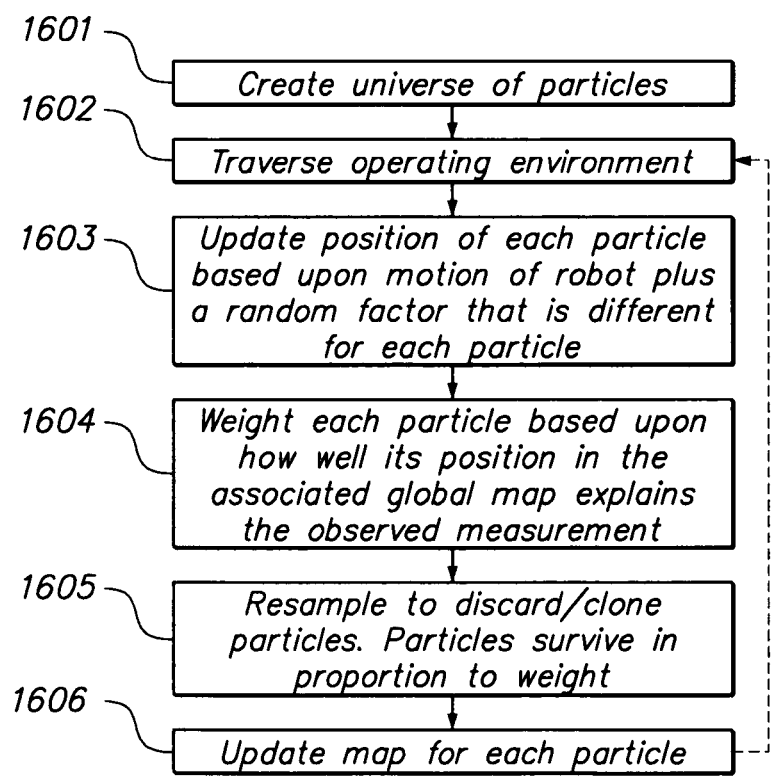
FIG. 16E is a simplified flow diagram illustrating one embodiment of a method of simultaneous localization and mapping.

FIG. 16E is a simplified flow diagram illustrating one embodiment of a method of simultaneous localization and mapping. As indicated at block 1601, a universe of particles may be created, each representing an hypothesis regarding the position and inclination of robot 100, and each having a respective version of a global map associated with it. As robot 100 traverses the operating environment (block 1602), real time data acquisition (such as via optical assembly 260) may provide distance measurements to observable features of the operating environment. These distance measurements may be employed to update positional data for each particle; as indicated at block 1603, such updating may be based upon a perceived or estimated motion of robot 100 (such as observations by optics assembly 260, odometer output, etc.), and may generally take into consideration a random error factor that is different for each particle. A weight or relevance score for each particle may be assigned or modified (i.e., incremented or decremented); as indicated at block 1604, the weight for a given particle may be based upon, or influenced by, how well that given particle's position in its associated global map explains a given measurement. The universe of particles may then be resampled, such that particles may be cloned or discarded, for example, as a function of weight or relevance (block 1605). In the foregoing manner, good candidate particles are reinforced, while particles exhibiting poor estimations of the global map may be ignored. Based at least upon the foregoing processing, a version of the global map associated with each discrete particle may be updated as indicated at block 1606. The process is generally iterative, as indicated by the loop back to block 1602.

Given the general uncertainty inherent in the approach, as well as the deliberate introduction of random error, typical SLAM methodologies employ large numbers of hypotheses (i.e., particles). Thousands of particles may be employed to assist the SLAM algorithm in selecting between many possible similar locations (as represented in the data structure) that may be the most accurate representation of the location of robot 100 associated with an individual distance measurement acquired in real time.

Where a global map is employed, the number of particles increases proportional to the size of the map, i.e., the operating environment as a whole. In this instance, two factors substantially increase minimum memory capacity and processing overhead requirements: the number of particles increases as the operating environment increases; and, consequently, the size of the global map that each particle must maintain in memory increases. Accordingly, the size or capacity of the memory required for data storage generally increases by the square of the area of the operating environment. Additionally, processor resources may be taxed due to the increased amount of data that needs to be updated at each iteration, i.e., with each distance measurement, for example, at predetermined intervals, or a combination of both.

A similar method that employs partial maps of the entire operating environment may provide efficiencies, minimizing processing overhead and required memory capacity. In such an alternative methodology, localization may also be based on discrete particles, each of which may be characterized as a discrete node in a data structure, each respectively including data related to an estimation of the current position and inclination of robot 100. In a departure from the method set forth above, an alternative implementation of the data structure may not require discrete particles to be associated with discrete versions of a global map of the operating environment. Rather, a single map may be associated with all of the particles.

Further, the entire operating environment may be segmented or partitioned, such that use of a global map is not necessary. In this embodiment, a series of partial maps may be employed to cover the entire operating environment in a mosaic or tile fashion. In that regard, FIG. 16G is a simplified top view of an operating environment partitioned into partial maps. Partial maps are represented by reference numerals P1, P2, . . . Pn. It will be appreciated that a sufficient number, n, of partial maps may be selected to ensure total coverage of the operating environment; the number, n, required may be influenced by various factors including, but not limited to: the overall size of the operating environment; the particular shape of the operating environment; obstructions disposed within or at the boundaries of the operating environment; the shape and surface areas of locations within the operating environment that robot 100 has been trained or otherwise instructed not to visit; limitations of optical assembly 260 or other sensing apparatus; and so forth.

Partial maps may generally be of any shape and size, though certain embodiments may be constrained as set forth in more detail below. Further, it will be appreciated that the borders between adjacent partial maps need not be rigid, nor computed with precision. It may be expected that certain partial maps may overlap with adjacent partial maps. For example, partial map P4 overlaps (such as in the areas indicated by cross-hatching) with both of partial maps P2 and P5 as indicated in FIG. 16G; similarly, partial maps Pn−1 and Pn are depicted as overlapping. Other partial maps may overlap as well, to greater or lesser degrees than those illustrated in the drawing figures. Such contemplated regions of overlap between partial maps have been generally omitted from FIG. 16G for clarity. It is also noted that the representation of an operating environment in FIG. 16G is not to the same scale as the operating environment depicted in FIGS. 11 and 16A-B. Further, while FIG. 16G illustrates a plurality of partial maps disposed in a fairly simple grid pattern, it will be appreciated that partial maps may be constructed using Cartesian coordinates or polar coordinates, for example, and that the present disclosure is not intended to be limited to any particular arrangement or orientation of partial maps, unless otherwise indicated with respect to certain embodiments.

As robot 100 traverses the operating environment, distance sensor measurements (such as output from optical assembly 260) may be employed to update the map of the space, as well as to increment or decrement a particle weight for localization purposes as appropriate. As with the methodology describe with reference to FIG. 16E, if a particular real time distance measurement fits well with what a given particle expects that measurement to be (e.g., based upon the data relating to the partial map), that particle's weight or relevance score may be increased. If, however, a particular distance measurement fits poorly with what a given particle would expect the measurement to be, the particle's weight or relevance may be decreased. As with the previous method, an individual particle may be discarded or ignored if an associated weight or relevance score falls below a predetermined threshold; conversely, an individual particle may be cloned (creating two or more identical particles) if an associated weight or relevance score exceeds a different predetermined threshold.

Similar to the FIG. 16E embodiment, wheel motion may be measured with an odometer or other instrument, and the position of each respective particle may then be updated based upon an estimation of how each particle would be expected to move, given the known rotation of wheels 242, 244. A small amount of random error may be introduced, causing identical (i.e., cloned) particles to drift away from each other over time. As noted above, robot 100 may not precisely follow the path that the odometer readings suggest, and the addition of random error tends to result in a universe of particles that account for numerous possibilities. Particle weights (or other relevance scoring system) may generally facilitate elimination of poor possibilities, identification promising possibilities, and reinforcement of the best ones.

Where the operating environment is partitioned into partial maps P1, P2, ... Pn, accurate localization results may be obtained even with a small number of particles. In particular, within the small partial map space, the number of possible positions and inclinations is relatively small (as compared, for example, to the entire operating environment, the extent of which may not be known). In some embodiments, 50 particles may be sufficient to represent a partial map, as compared to thousands which may be required to represent a global map using the SLAM technique described above. Additionally, because only a subset or partition of the global map is considered at any given processing step, the number of particles does not need to increase as the size of the overall space increases; accordingly, memory capacity required for the data structure may increase linearly in proportion to the overall area of the operating environment (as opposed to increasing in accordance with the square of the area).

Further, since all of the particles may take bearings based upon a single map in one embodiment of this alternative implementation (rather than requiring each discrete particle to employ a respective dedicated version of a global map), additional memory capacity savings may be achieved. For example, this alternative methodology may provide as much as a 50× reduction in required memory or data storage capacity as compared to the method described above with reference to FIG. 16E. It will be appreciated that, since memory requirements increase linearly rather than exponentially, memory reduction may be much greater than 50×, depending upon the extent of the operating environment.

In accordance with this alternative implementation, a partial map Pn is built in accordance with features within the operating environment that can be readily identified and accurately mapped. In an exemplary embodiment, the boundary of a partial map may generally be constrained by the largest square that fits within the diameter of the range of a distance sensing apparatus (such as optical assembly 260), though other shapes of such maps, as well as differing criteria affecting the expanse of those maps, may have utility in various applications. Partial maps P1, P2, ... Pn may be bounded by physical extremities of obstacles and other features within the operating environment, as well as by "exits" to neighboring or adjacent partial maps. In this context, it will be appreciated that an "exit" boundary with respect to a partial map may generally be characterized by a route or path to another (such as, but not necessarily limited to, an adjacent) partial map.

In some embodiments, each partial map may be characterized by a respective "scan point". In practice, a location within a partial map may be selected based upon an estimation of which location within the space might afford the best view of the overall partial map space; alternatively, such a scan point may be selected in accordance with convenience, efficiency, or expediency, for example, irrespective of any assessment regarding the quality of the view from a particular location. In one implementation, for example, the scan point may be selected as the location estimated to be the furthest point from all known or observed boundaries or features, though other options are possible. As set forth below, localization and mapping techniques employing partial maps are particularly robust, and need not rely for efficacy on any particular "ideal" or "optimal" scan point with respect to field of view, maximum observable range, or other factors.

Each partial map may additionally include positional data that facilitate identification of relative positions of adjacent (or other) partial maps. These data may represent indications or estimations of the respective relative position of a selected scan point for each respective adjacent partial map. This information is stored, for example, in an exit structure, which informs robot 100, operating under control or direction of electronics module 220, how to reach a scan point for a neighboring partial map. In that regard, partial maps may be "loosely associated" through the connection (within the data structure) of an exit to the scan point of an adjacent map; i.e., the relative position information between neighboring maps need not be accurate. As robot 100 moves from one partial map to the next, its exact position within the new partial map may be readily computed.

As noted above, an overall global map may be characterized by a collection of the plurality of partial maps, and may be reconstructed if desired, based upon data from known partial maps.

To ascertain whether robot 100 has entered a previously known partial map, some particles may be placed deliberately in previously visited partial maps ("flag" particles). If the current position of robot 100 at a given instant in time is also found (based upon the existence of one or more flag particles) to be in a previously visited partial map, the flag particles may begin to receive high weights from the system. Such a strategy, generally referred to as "closing the loop", enables robot 100 (via electronics module 260 or other processing element) to determine that it has re-entered known space. By tracking the maximum magnitude of aggregate error associated with connecting (e.g., tiling or stitching) partial maps together, it is possible to restrict the placement of such flag particles to areas that are most likely to represent positions that robot 100 may actually occupy. This technique may minimize the extra memory associated with insertion of flag particles that otherwise might be required. Further, the weights of flag particles may be updated less frequently than the particles associated with the partial map that robot 100 currently is traversing. Minimizing the frequency with which flag particles are updated reduces the processing power required to maintain an accurate record these additional particles.

Figure 16F:
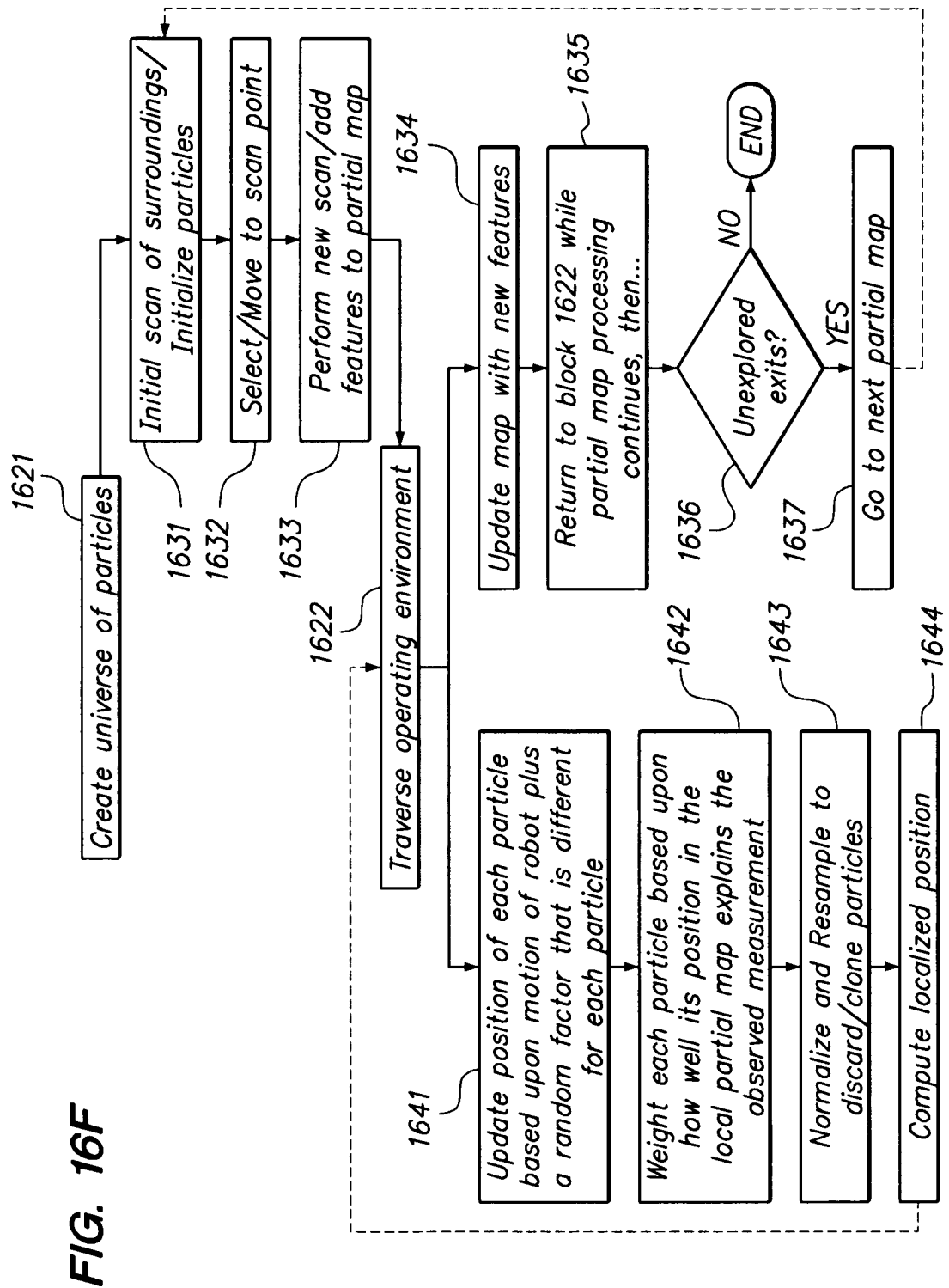
FIG. 16F is a simplified flow diagram illustrating an exemplary embodiment of a method of simultaneous localization and mapping that employs partial maps.
Figure 16G:
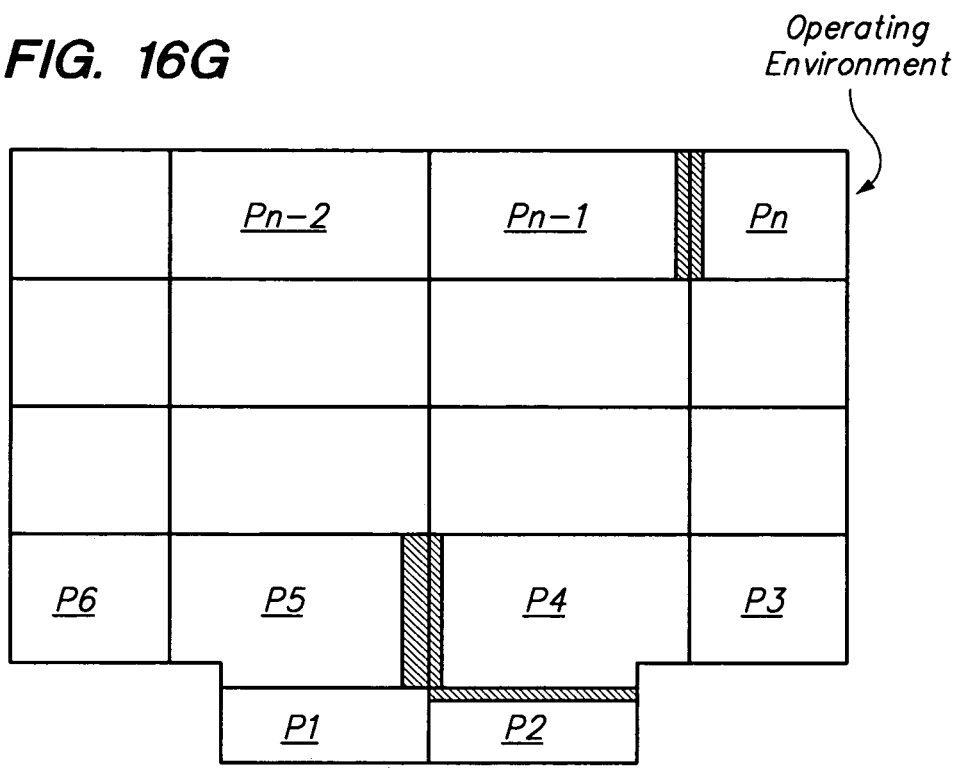
FIG. 16G is a simplified top view of an operating environment partitioned into partial maps.

FIG. 16F is a simplified flow diagram illustrating an exemplary embodiment of a method of simultaneous localization and mapping that employs partial maps.

As indicated at block 1621, a universe of particles may be created, each representing an hypothesis regarding the position and inclination of robot 100. As noted above, none of these particles requires a respective version of a global map associated with it; in fact, in some embodiments, no global map is necessary. An initial scan (e.g., in a 360 degree or other arc) of the operating environment may be conducted as indicated at block 1631; this scan may be executed by optical assembly 260, for example, or by some other distance measuring technology. Based at least partially upon results of the initial scan, a scan point for a partial map may be selected as indicated at block 1632; as noted above, a point in a particular partial map that is estimated to be the most distant from each observable feature of the operating environment that falls within the partial map may be selected as a scan point, though other criteria may be suitable in some applications. While maintaining localization (based, for example, upon results of the initial scan), robot 100 may traverse the operating environment to the identified scan point.

As indicated at block 1633, a supplemental scan (e.g., in a 360 degree or other arc), may be performed to acquire optical data from the scan point. These optical data may be employed as a basis to begin construction of a partial map. For example, locational information regarding the features and boundaries of the operating environment, regarding obstacles disposed in the operating environment, or a combination of each, as observed from the scan point may be stored in memory for subsequent processing by electronics module 220. As a baseline, it will be appreciated that information gathered during this supplemental optical scan may influence the partial map to a greater degree than any information acquired during subsequent scanning operations.

Mapping procedures, depicted on the right side of FIG. 16F, may be performed repeatedly while robot 100 is traversing the operating environment (block 1622) as it performs assigned or preprogrammed tasks. With respect to the partial map currently occupied (i.e., the "local" partial map) by robot 100, the local map may be updated with newly acquired information output from distance sensing technology (i.e., optical assembly 260); updated data may be provided continuously, periodically, or on-demand, for example, depending upon available processor resources available at electronics module 220, limitations of hardware implemented in optical assembly 260, sophistication of programming code, and other factors. The local map may therefore evolve in accordance with newly acquired data, as those data are received; this updating functionality is depicted at block 1634. To simplify processing operations, it may be desirable that electronics module 220 always assume that robot 100 is properly localized at a given position within the local partial map (localization procedures are depicted in the lower left portion of FIG. 16F).

As indicated at block 1635, the foregoing updating operation may be iterative, as electronics module 220 builds and modifies the local partial map during execution of the assigned task by robot 100. When all areas of the local partial map have been treated in accordance with dynamically varying or predetermined instructions provided to electronics module 220, robot 100 may search for an unexplored exit from the local map (decision block 1636). Any unexplored exits may be visited randomly, for example, in accordance with logic that prescribes a relative priority to unexplored exits, or otherwise as desired based upon different criteria. This functionality is indicated at block 1637. It will be appreciated that various methods of determining which partial map to visit next may be employed. For example, electronics module 220 may instruct robot 100 to visit the closest unexplored exit first; alternatively, the exit having the smallest estimated physical size may be examined first (e.g., this exit may be considered most likely to be a dead end). As another alternative, sophisticated algorithms may estimate an order to visit partial maps that minimizes total operational time for a particular task. The present disclosure is not intended to be limited to any particular methodology employed to decide an order or priority of visiting partial maps.

If no unexplored exits from the local partial map exist, electronics module 220 may traverse the entire map structure to identify the closest unexplored exit associated with any partial map (whether adjacent to the local map or not); if one or more unexplored exits exists, robot 100 may be instructed to navigate to one in order to continue with an assigned task; as noted above, selection of a next sequential partial map may be random, prioritized, or otherwise based upon a variety of factors. When an unexplored exit does not exist anywhere in the map structure, mapping procedures may cease, as the entire operating environment has been traversed and appropriately mapped.

Once robot 100 has arrived at an unexplored exit, the foregoing procedures may be repeated (as indicated by the loop back to block 1631) beginning with identification of a scan point based at least in part upon input received during an initial optical scanning operation (with respect to the next sequential partial map).

Further, robot 100 may use explored exits to traverse from a location in one partial map to a known location in another partial map. For example, robot 100 may be instructed to return to a recharging station or base (described below), or to some other predetermined or otherwise designated location, upon completion of a task; when robot 100 completes the task, electronics module 260 may employ data regarding locations of known, explored exits to guide robot 100 through a series of partial maps, allowing robot 100 to proceed from its current position to a predetermined or otherwise designated destination. While traversing a particular partial map, robot 100 may find its bearings well enough to locate the position of an exit that leads to an appropriate adjacent partial map.

As noted above, localization procedures are depicted in the lower left portion of FIG. 16F. Initially, particles may be initialized (as depicted at block 1631) based at least in part upon results of the initial scan of the local partial map. Following this initialization procedure, each particle may be assumed to be at the position of robot 100.

Motion of robot 100 may be monitored substantially as set forth above. For example, estimations of motion may be based upon odometry (or other) measurements acquired since the last iteration of the algorithm. A position update may be applied to each particle based upon this motion model; as indicated at block 1641, the position updates may be intentionally distorted with some error factor that is different for each particle.

A weight or other score for each particle may then be computed; this computation may be based, at least in part, upon the latest distance measurements and an estimation of how well those measurements coincide with the local partial map, assuming that the measurements were acquired from the position of the particle currently being analyzed and weighted. Specifically, each particle may be assessed to determine how well its position relative to the local partial map explains or reaffirms the most recently acquired optical data. This procedure is depicted at block 1642.

The weights or scores for each particle may be normalized, and the universe of particles may be resampled, as indicated at block 1643. In this context, a resampling operation may clone particles as a function of weight, for example, where weight may be considered as a probability. High weight particles may generally be perceived as having a higher probability of being identified as accurate; consequently, the highest scoring particles (or those with the greatest weight) may be cloned several times. Conversely, lower weighted particles will most likely not be cloned at all; the lowest weighted particles may be discarded or otherwise ignored in subsequent processing. In accordance with this embodiment, cloned particles may be treated as new working particles, i.e., particles that are active and available for analysis.

As indicated at block 1644, a localized position for robot 100 may be computed based upon results of the foregoing operations. In some embodiments, a localized position may be calculated by determining an average position and angle for all of the particles currently available for analysis, though other computations may be appropriate in some instances. For example, a localized position may be calculated by determining an average position and angle for the particles within a region of high (or highest) particle density; the bounds of such a region may be influenced by a threshold particle density, for example, or may be artificially limited to a certain maximum area. As indicated by the loop back to block 1622, the foregoing localization procedure may be iterative, occurring continuously or periodically as robot 100 traverses the operating environment to perform a task.

It will be appreciated that the FIG. 16E embodiment requires a global map associated with each particle to facilitate loop-closing in a large space. Using a winding hallway as an example, if the global map does not accurately model the length and shape of each twist and turn, then it is not possible to know that the hallway itself forms a closed loop. Maintaining a discrete global map associated with each discrete particle allows for a large number of hypotheses with respect to the shape of the overall global map, providing a mechanism to ensure that the actual shape of such a complex operating environment has been included in the possibility set.

With respect to the FIG. 16F embodiment employing partial maps, however, loop-closing is relatively easier, since optical assembly 260 may observe every structure, feature, and obstruction within a given local partial map, and may therefore provide information regarding these items to electronics module 220. Closing larger loops is not much more complicated, since the loop traverses multiple partial maps. Since these partial maps are loosely coupled by design as set forth above, accumulated errors do not prevent the system from identifying that the loop has been closed.

It will be appreciated that some or all of the foregoing functionality may be executed by electronics module 220, for example, operating independently or in conjunction with interface 1020 of optical assembly 260. Sufficient processor resources and memory may be implemented on a single chip, for example, or in a very small package, particularly in the FIG. 16F embodiment employing partial maps. It is noted that the arrangement of the blocks in FIG. 16F does not necessarily imply a particular order or sequence of events, nor is it intended to exclude other possibilities. For example, the operations depicted at blocks 1622, 1634, and 1635 may occur substantially simultaneously with each other; further, these operations are generally occurring substantially simultaneously with the localization operations depicted at blocks 1622 and 1641-1644. Those of skill in the art will readily recognize that numerous modifications and variations may be appropriate in certain circumstances, depending, for example, upon processor and internal communications bandwidth, memory capacity, capabilities of optical assembly 260, and the like.

In addition, any permanent characteristics or other special features of the operating environment may be stored in memory and associated with a particular partial map or a selected group of partial maps. This strategy may retain in memory any feature or aspect of the operating environment that should or must be "remembered" (or that might otherwise have utility) during a single operating cycle, or from cycle to cycle, to facilitate navigation, obstacle avoidance, or both. For example, if a virtual or phantom wall were defined (e.g., as set forth in detail above) within the operating environment to prevent robot 100 from entering a particular space, the location of that phantom wall may be stored as a feature within a given partial map or series of partial maps (depending, for example, upon the extent of the phantom wall). Though such a feature may not be perceived by optical assembly 260, electronics module 220 may nevertheless be apprised of its existence, and maintain appropriate data records associated with appropriate partial maps.

In that regard, it will be appreciated that data regarding or associated with certain partial maps may be stored in compressed format to minimize memory requirements. Partial maps within which robot 100 is not currently operating (i.e., not the local partial map), along with any permanent characteristics or special features such as described above, may be stored in a compressed format; data associated with a specific partial map may subsequently be decompressed or expanded for processing when robot 100 enters that partial map and it becomes the local partial map.

Additionally or alternatively, data associated with the local partial map may be stored in memory in a compressed format that may or may not be different from the compressed format that is used for other partial maps. Since some data associated with the local partial map may be accessed an updated as robot 100 moves through the operating environment, a compression scheme that reduces or minimizes the processing load associated with decompression and recompression may have particular utility in such an embodiment. One such compression scheme may store the local partial map as an hierarchical block structure; in some embodiments, the overall space of the local partial map may be segmented into blocks that form a mosaic of the space; as partial maps provide a segmented representation of the entire operating environment, such blocks may provide a segmented representation of the local partial map. Such blocks may be arranged as a tiled mosaic as noted above, for example, or may overlap to some degree. Blocks may comprise representations of structures or features that have been mapped, for example, and may additionally or alternatively include regions in which no structural or virtual elements exist.

In that regard, each block may be identified or flagged as having a state. In some embodiments, it may be useful to identify three states: unknown; vacant; and "other." If a block is flagged as "unknown", data regarding the location in the operating environment represented by the block may be acquired as set forth above; subsequent acquisition of such data may allow an "unknown" block to be recharacterized or reclassified as having a different state. If the location in the operating environment represented by a block is known to be devoid of structures, obstacles, or other (physical or phantom) features that require mapping, that block may be flagged as "vacant", and may potentially be ignored in further processing operations. If a block is flagged as "other", that block may contain smaller blocks (i.e., "sub-blocks") that may be identified or flagged in a similar manner. Sub-blocks may contain grid cells that include a representation or other indication of whether a cell is empty or vacant. It will be appreciated that blocks flagged as "other" may contain both regions or sub-blocks that are "vacant" as well as regions or sub-blocks that are characterized by mapped structures or features.

In some embodiments, the foregoing data structure may facilitate processing, for example, by minimizing the amount of data for a local partial map that is decompressed, updated, and subsequently recompressed. As will readily be appreciated from the detail provided above, the majority of processing power required for simultaneous localization and mapping techniques generally may be related to determining the distance measurement each particle expects a distance sensing apparatus or instrument to acquire at each angle relative to robot 100. Accurate localization and precise mapping may require substantially less processing power if large areas of the local partial map are known to be empty, and can be identified as such (e.g., subsequent processing with respect to such vacant areas may be omitted, freeing resources for processing of unknown areas or areas including identifiable features). In the foregoing manner, the data structure may be examined prior to processing, such that certain blocks are updated while others are not.

Recharging and Off-Duty Cycles

Figure 18:
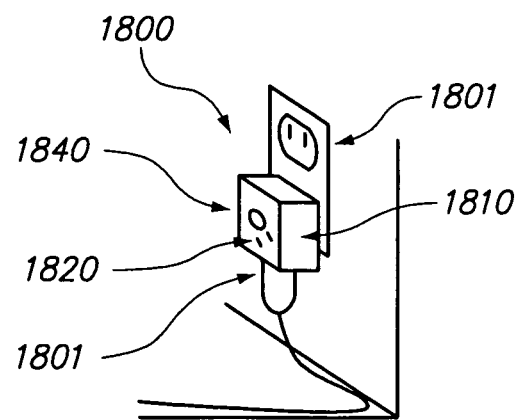
FIG. 18 is a simplified view of a recharging station.
Figure 19A:
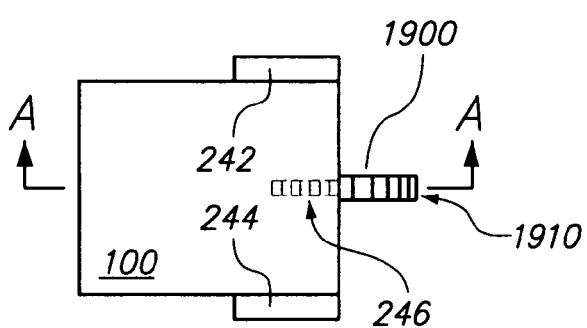
FIGS. 19A and 19B are simplified top and cross-sectional side views, respectively, illustrating one embodiment of a robot configured to occupy minimal space when off-duty.
Figure 19B:
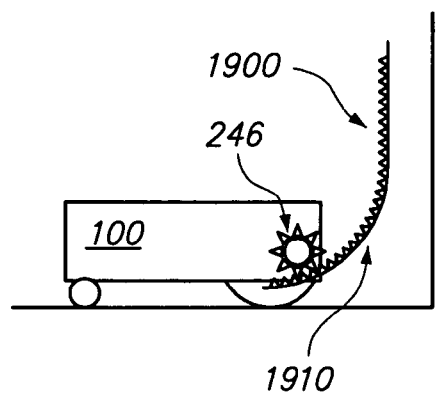
Figure 20A:
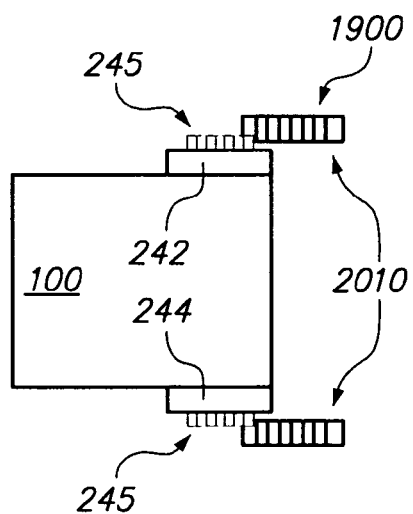
FIGS. 20A and 20B are simplified top and cross-sectional side views, respectively, illustrating one embodiment of a base.
Figure 20B:
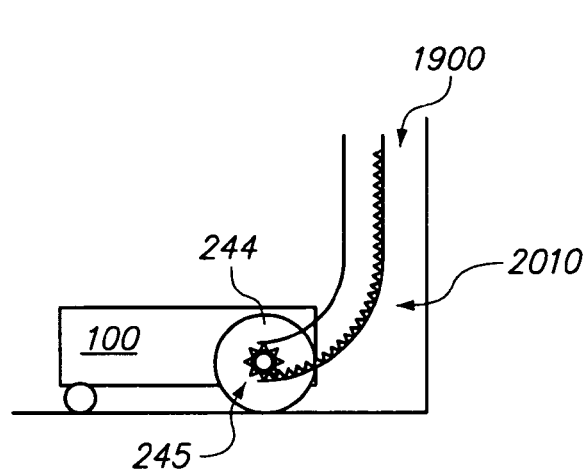

As described above, it is often desirable to remove robot 100 from an operating environment. FIG. 18 is a simplified view of a recharging station. FIGS. 19A and 19B are simplified top and cross-sectional side views, respectively, illustrating one embodiment of a robot configured to occupy minimal space when off-duty. As illustrated, embodiments of robot 100 may be configured and operative to climb upright, for example, against a wall. FIGS. 20A and 20B are simplified top and cross-sectional side views, respectively, illustrating one embodiment of a base.

In some embodiments, robot 100 may be deployed to an upright position both to reach a recharging station 1800 as well as to achieve an advantageous perspective of the operating environment as described above. Recharging station 1800 may comprise an adapter 1810 to be plugged into an ordinary electrical outlet 1801, for example, and may provide appropriate electrical contacts 1820 with which robot 100 engages. As indicated in FIG. 18, recharging station 1800 may optionally include a secondary electrical outlet 1830 such that other devices may share the primary outlet 1801 into which recharging station 1800 is inserted. Recharging station 1800 may also include a homing beacon 1840 to broadcast (such as with RF or IR signals) its location to robot 100. Sensor array 230, optical assembly 260, or a combination of both, may be employed to direct robot 100 to recharging station 1800, either independently or with assistance from homing beacon 1840. Those of skill in the art will readily appreciate that other embodiments of recharging station 1800 are also possible; for example, recharging station 1800 may be rigidly affixed to a wall at a desired location, and may use a cord or cable to receive electrical power. Alternatively, recharging station 1800 may be hard-wired to the electrical system of the home or commercial building in which it is employed.

When not in use, robot 100 may engage recharging station 1800 to receive power sufficient to recharge any internal batteries or battery packs carried by body 200 or a functional cartridge. Accordingly, body 200 may comprise electrical connectors or other conductive structures suitably positioned and dimensioned to mate with electrical contacts 1820 on recharging station 1800 when robot 100 engages recharging station 1800. Various methodologies for making automatic electrical connections upon operative engagement of two components are generally known and widely utilized in a variety of arts.

To position robot 100 appropriately for recharging operations, recharging station 1800 may generally comprise, or be employed in conjunction with, a base 1900. In that regard, base 1900 may be characterized by structures effective in facilitating coupling of robot 100 to recharging station 1800 as well as in positioning robot 100 in a desired orientation. In some embodiments, base 1900 may comprise a motor or other actuator that actively lifts robot 100 into proper position for coupling with recharging station 1800; once engaged with a track 1910 or other mechanism, for example, robot 100 may be oriented into a desired position without using its own power. Alternatively, robot 100 may operate under its own power using drive mechanism 240 to position itself on base 1900.

In the embodiment illustrated in FIGS. 19A and 19B, for example, an engagement gear 246 on the underside of body 200 may be configured to mate with track 1910 associated with base 1900. Robot 100 may be secured to track 1910 via a T-slot, for example. In another embodiment that does not require addition of gear 246 on body 200, base 1900 may generally comprise side rails 2010 that are positioned to engage a gear or sprocket teeth (reference numeral 245 if FIGS. 1A and 1B) integrated with wheels 242 and 244, as illustrated in FIGS. 20A and 20B. In accordance with this embodiment, robot 100 may climb into a desired position under its own power through drive mechanism 240 as noted above.

To climb a geared base 1900 as depicted in FIGS. 20A and 20B, a respective gear 245 for each respective wheel 242,244 may align with those provided on rails 2010 associated with base 1900. It will be appreciated that proper alignment of gears 245 and rails 2010 may be accomplished in several ways. Wheels 242,244 may be provided with built-in sensors, for example, to detect the position of teeth on gears 245. Robot may selectively rotate wheels 242,244 such that teeth of gears 245 are precisely aligned with each other and with the gear teeth on rails 2010. Robot may employ sensor array 230, optical assembly 260, or a combination of both, to assist in alignment. Gear tracks on rails 2010 may have an interlock mechanism that prevents wheels 242,244 from proceeding forward unless both are properly engaged; robot 100 may mount rails 2010 and slowly move both wheels 242,244 forward with low torque until proper engagement allows free movement.

Base 1900 may include mirrors to facilitate alignment of robot 100 for engagement with track 1910 or rails 2010. For example, small mirrors or other reflective surfaces may be situated on base 1900 in such a way as to reflect signals output by sensors 231. Where the particular geometry and relative location of sensors 231 on body 200 are known, these reflective surfaces may be positioned and oriented such that sensors 231 receive a particular signal (such as a maximum return, for example) or other indication when precise alignment has been achieved. In the foregoing manner, proper alignment may be ensured prior to, or substantially simultaneously with, contact with track 1910 or rails 2010. Alternatively, robot 100 may try to climb base 1900 with misaligned engagement; where rails 2010 include an alignment mechanism (such as a funnel or widened portion), robot 100 may be less precise, and rails 2010 are structured to facilitate proper engagement.

Figure 21:
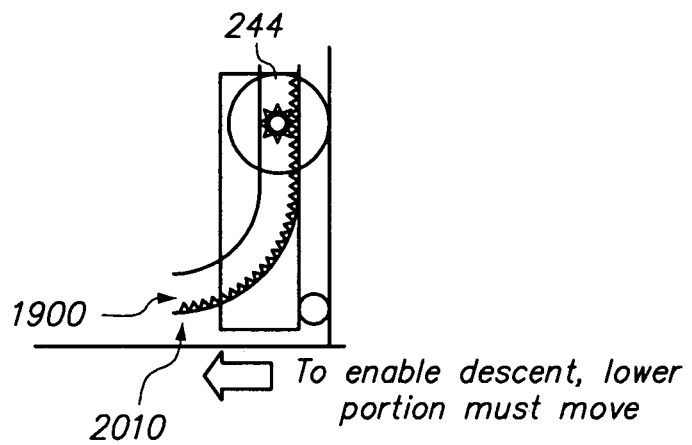
FIG. 21 is a simplified side view of a robot engaged with one embodiment of a base and recharging station during an off-duty cycle.
Figure 22:
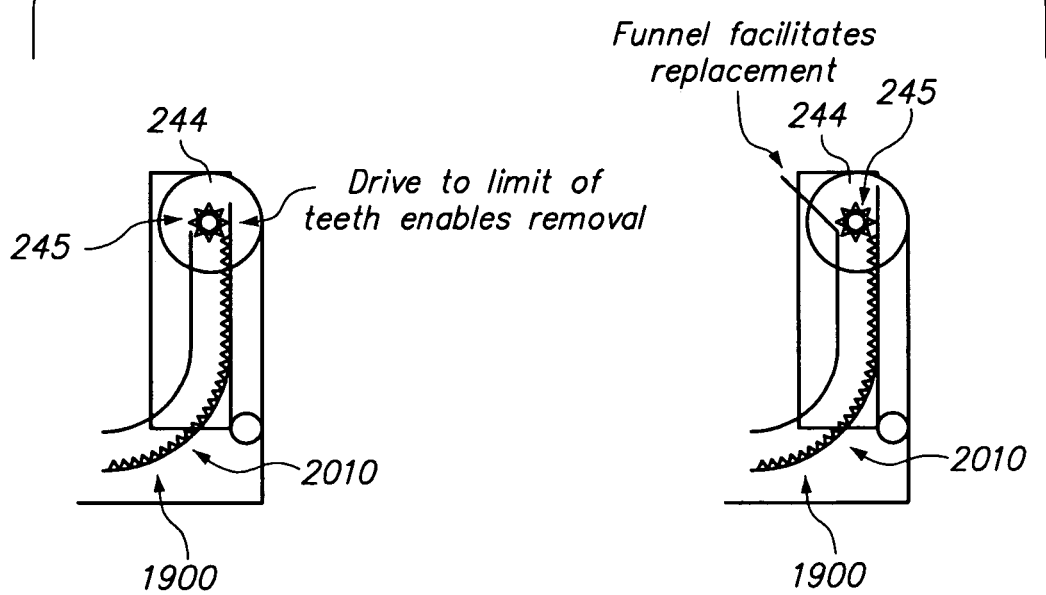
FIG. 22 is a simplified side view of a robot engaged with another embodiment of a base and recharging station during an off-duty cycle.

FIGS. 21 and 22 are simplified side views of a robot engaged with embodiments of a base and recharging station during an off-duty cycle. It will be appreciated that a mechanism may be provided to facilitate removing robot 100 from base 1900 for operation. Where robot 100 is positioned as indicated in FIG. 21, the lower portion of body 200 may be moved away from the wall as robot 100 is descending (i.e., leaving the wall base). A mechanism enabling robot 100 self-removal from base 1900 and charging station 1800 may be provided in several ways, by way of example. A mechanical lever may be employed physically to push the lower portion of body 200 away from base 1900 as robot 100 descends. Alternatively, a damping mechanism or governor may be included in drive mechanism 240. In accordance with this embodiment, when wheels 242 and 244 are driven faster than a specified rate, the governor system intervenes to retard rotation. Such a damping mechanism may be pneumatic or hydraulic, for example, or may be friction-based. Powering wheels 242,244 to lower robot 100 faster than the damping mechanism allows wheels 242,244 to rotate may cause such a damping mechanism to exert a torque on robot 100, generally tending to pull the lower portion outward and upward.

Alternatively, a secondary wheel or gear, which may be either active or passive, may be included on body 200 and positioned to engage a track (such as on rails 2010, for example, or a dedicated track) associated with base 1900. In addition to facilitating departure from base 1900 by orienting body 200 appropriately, this embodiment may provide additional advantages, such as enabling desired mechanical functions, in some situations. For example, such a secondary wheel or gear may be employed to perform a maintenance function each time robot 100 returns to base 1900 following a cleaning cycle. As noted above, it may be desirable to run a peristaltic pump in reverse periodically—a secondary gearing mechanism disposed on body 200 and configured to engage a track at base 1900 may be employed to enable such a reverse cycle for pump 393. Additionally or alternatively, pad 330 material may be advanced (such as by take-up roller 332, or another structure in a different embodiment) using such a secondary gear, saving the cost of a motor for this function. Other functions may be performed as well, for example: component covers may be opened or removed; sensors may be deployed; the operating mode of optical assembly 260 may be toggled (as an alternative to accomplishing this electrically, e.g., under control of electronics module 220); structural components of robot 100 may be reconfigured to occupy less space while robot is off-duty; and the like.

As noted above, a secondary wheel, gear, or other protruding structural member may be positioned to ride in the track (such as may be employed by rails 2010) that is used to situate robot 100 on base 1900 or in an alternate, secondary track. A secondary track may be advantageous in some circumstances. In that regard, a secondary track may allow customized motion for the secondary set of gears or wheels, providing flexibility with respect to the functions enabled thereby. For example, the secondary track may include teeth or threads for a limited distance, allowing fewer rotations of the second set of gears than occurs for the main drive wheel (242,244).

The FIG. 22 implementation of base 1900 may allow robot 100 to be removed manually. As illustrated in FIG. 22, one way to enable this functionality is to allow robot 100 to drive to the limit of gear teeth in rails 2010. Optionally including a funnel shape at the top of base 1900 (as depicted at the right side of FIG. 22) may facilitate manual replacement of robot 100. In some implementations of base 1900, rails 2010 may be designed to pull robot 100 towards the wall near the top of base 1900. Such an arrangement may keep robot 100 as flat to the wall as possible, while avoiding protruding molding near the floor. Additionally, this strategy may facilitate proper engagement of components of body 200 with recharging contacts 1820 at recharging station 1800.

A section of track associated with base 1900 may be selectively detachable, allowing base 1900 to be used against a wall as depicted in the drawing figures (i.e., with a vertical section attached) or on a floor when the vertical section is detached. This provides flexibility, and may allow certain features of base 1900 (such as operative coupling with recharging station 1800, beacon features, and the like) to be employed even in situations where a vertically oriented base 1900 is not desired.

In addition to, or as an alternative to, any homing technology employed by recharging station 1800, base 1900 may include features that allow robot 100 to identify the location of base 1900 within the operating environment. A beacon may be employed, for example, using RF or IR signals that may be received by sensor array 230. Additionally or alternatively, a unique identifying shape, an arrangement of colored spots, or other identifying symbols may be detected using distance measuring technology, for example, executed by optical assembly 260.

In that regard, it will be appreciated that base 1900 may incorporate structural elements or electronic components that facilitate navigation in the operating environment. Navigational assistance may comprise a beacon that varies a signature in accordance with angle of transmission. For example, an IR or RF marker may sweep across the operating environment while varying a signal characteristic (such as frequency) or a data characteristic (such as digitally transmitting data representing current angle) as the sweep occurs. Upon receipt by sensor array 230 and appropriate processing by electronics module 220, robot 100 may use such a signal to determine a component of its current position, i.e., angular orientation relative to base 1900.

A single base 1900 transmitting angle information may assist robot 100 in determining its exact position in the operating environment if the distance to base 1900 is known. Distance may be determined by examining relative angles between two known features base 1900. These features may be two beacons, for example, in which case robot 100 may receive angle information directly from each beacon as set forth above. Additionally or alternatively, the features may be structural, in which case robot 100 may employ optical assembly 260 to observe angular orientation. Where the distance between these features are known and stored in electronics module 220, accurate distance to base 1900 may readily be computed. As another alternative, multiple stations may transmit angle information from different locations in or around the operating environment; one of these stations may be base 1900, while other stations may be simple beacon stations. Triangulation of signals received from multiple stations may assist in accurate measurement the precise location of robot 100.

It will be appreciated that various modifications to base 1900 may have utility in certain situations, and that additional structures may be included to enable or to facilitate desired functionality. For example, base 1900 may comprise one or more liquid reservoirs to allow automatic or manually assisted replenishment of cleaning solution or other liquids (e.g., to fill reservoir 380) where necessary or desired. Additionally or alternatively, base 1900 may comprise a waste receptacle for receiving debris and other particulate matter from elements of a functional cartridge (e.g., from receptacle 312 or suction chamber 920). In some sophisticated embodiments, base 1900 may be so constructed to swap out multiple functional cartridges, such that a first cartridge remains attached to base 1900 when a second cartridge is coupled to body 200 for use, and vice versa. In the foregoing manner, operator interaction with consumables, waste, and structural components of robot 100 may be minimized.

Additionally, base 1900 may be constructed with racks, shelves, compartments, or other storage areas to accommodate consumables, bottles, and other supplies (such as the reflective strips or swatches employed to train electronics module 220 as described above). In one embodiment, base 1900 may employ a holder, clip, socket, or other structure for retaining a remote control unit. In more sophisticated embodiments, the holder may be integrated with base, for example, to achieve an esthetically pleasing look or for more utilitarian purposes. In some instances, such an arrangement may allow operable coupling of a remote control unit with base 1900 to allow the remote control unit to recharge internal batteries, to enable bi-directional data communications between the remote control unit and base 1900 or electronics module 220, and the like.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of mapping an operating environment to facilitate localization of a movable robot having a rotating mount, said method comprising:
    acquiring optical data, from a stationary object, at a scan point on the stationary object, the scan point being associated with a partial map representing a portion of the operating environment;
    identifying features of the portion of the operating environment and associating identified features with said partial map;
    traversing the portion of the operating environment represented by said partial map;
    acquiring additional optical data, from the stationary object, at the scan point on the stationary object;
    updating said partial map responsive to said traversing and said acquiring additional data;
    computing a location of the robot in the operating environment by determining an average position and angle for particles selected in accordance with the optical data and the additional optical data; and
    selectively repeating said traversing, said acquiring additional data, and said updating so as to avoid-revisiting areas that have already been mapped;
    wherein said updating said partial map comprises using the average position and angle for all of the particles; and
    wherein said acquiring optical data and said acquiring additional optical data comprise utilizing a source of collimated light and a source of diffuse light on the rotating mount.

2. The method of claim 1 further comprising exiting said partial map and proceeding to a scan point of a different partial map representing a different portion of the operating environment.

3. The method of claim 1 wherein said identifying and said updating comprise computing a distance to an identified feature responsive to the optical data and the additional optical data.

4. A method of mapping an operating environment to facilitate localization of a movable robot having a rotating mount, said method comprising:
    segmenting the operating environment into a plurality of partial maps, each respective one of said plurality of partial maps representing a respective portion of the operating environment;
    mapping a respective one of said plurality of partial maps by:
        acquiring optical data, from a stationary object, at a scan point on the stationary object to identify features associated with the respective portion of the operating environment;
        responsive to said acquiring, associating identified features with said respective one of said plurality of partial maps and determining an average position and angle for particles selected in accordance with the optical data;
        selectively repeating said acquiring, said associating, and said determining so as to avoid re-visiting areas that have already been mapped;
        creating a single map of said respective one of said plurality of partial maps using the average position and angle for all of the particles; and
        exiting said respective one of said plurality of partial maps and proceeding to a different one of said plurality of partial maps representing a different portion of the operating environment;
    and
    selectively repeating said mapping until each respective portion of the operating environment has been mapped;
    wherein said acquiring optical data at a scan point comprises utilizing a source of collimated light and a source of diffuse light on the rotating mount at the scan point in each respective portion of the operating environment.

5. The method of claim 4 wherein said associating comprises compressing a data structure maintaining data representative of said respective one of said plurality of partial maps.

6. A method of determining a localization of a movable robot, having a rotating mount, within an operating environment, said method comprising:
    segmenting the operating environment into a plurality of partial maps;

acquiring data at a scan point, on a stationary object, related to a distance between the movable robot and a feature in a portion of the operating environment corresponding to the one of said plurality of partial maps currently occupied by the movable robot;

computing a location of the movable robot in accordance with said acquiring, wherein said computing comprises determining an average position and angle for particles selected in accordance with the data and further comprises updating said one of said plurality of partial maps using the average position and angle for all of the particles; and selectively repeating said acquiring and said computing so as to avoid re-visiting areas that have already been mapped;

wherein said acquiring data at a scan point comprises utilizing a source of collimated light and a source of diffuse light on said rotating mount at the scan point on the stationary object in a portion of the operating environment corresponding to the one of said plurality of partial maps currently occupied by the robot.

7. A movable robot having a rotating mount, the movable robot comprising a non-volatile computer-readable medium encoded with data and instructions for determining a location of the movable robot in an operating environment; the data and instructions causing the movable robot to:

generate a plurality of particles, each of said plurality of particles having associated hypothesis data representing an hypothesis regarding a position and an inclination of the robot;

acquire data at a scan point, on a stationary object, related to a perspective of the operating environment from a current location of the movable robot utilizing a source of collimated light and a source of diffuse light on the rotating mount at the scan point on the stationary object;

compare said data to said hypothesis data associated with at least some of said plurality of particles;

apply a weight to at least some of said plurality of particles in accordance with the comparison of said data and said hypothesis data; and selectively repeat the generate, acquire, compare, and apply steps so as to avoid areas that have already been mapped;

wherein a position component of said hypothesis data for each of said plurality of particles is restricted to a subset of locations in the operating environment, and wherein a location of the movable robot in the operating environment is computed by determining an average position and angle for the particles in the subset, and wherein a map of the operating environment is constructed using the average position and angle for all of the particles.

8. The movable robot of claim 7 further encoded with data and instructions; the data and instructions further causing the movable robot to:

increase a weight for one of said plurality of particles when said associated hypothesis data are similar to said data acquired by the movable robot; and decrease a weight for one of said plurality of particles when said associated hypothesis data are not similar to said data acquired by the movable robot.

9. The robot of claim 8 further encoded with data and instructions; the data and instructions further causing the movable robot to discard those of said plurality of particles having a weight below a discard threshold.

10. The robot of claim 8 further encoded with data and instructions; the data and instructions further causing the movable robot to clone those of said plurality of particles having a weight above a clone threshold.

\* \* \* \* \*